US008653772B2

(12) United States Patent
Takamatsu et al.

(10) Patent No.: US 8,653,772 B2
(45) Date of Patent: Feb. 18, 2014

(54) CONTROL DEVICE FOR VOLTAGE CONVERSION DEVICE, VEHICLE INCORPORATING THE SAME, AND CONTROL METHOD FOR VOLTAGE CONVERSION DEVICE

(75) Inventors: Naoyoshi Takamatsu, Susono (JP); Masaki Okamura, Toyota (JP); Yasuhiro Koike, Kariya (JP)

(73) Assignees: Toyota Jidosha Kabushiki Kaisha, Aichi-ken (JP); Kabushiki Kaisha Toyota Jidoshokki, Aichi-ken (JP)

( * ) Notice: Subject to any disclaimer, the term of this patent is extended or adjusted under 35 U.S.C. 154(b) by 250 days.

(21) Appl. No.: 13/375,738

(22) PCT Filed: Jun. 2, 2009

(86) PCT No.: PCT/JP2009/060029
§ 371 (c)(1),
(2), (4) Date: Dec. 1, 2011

(87) PCT Pub. No.: WO2010/140212
PCT Pub. Date: Dec. 9, 2010

(65) Prior Publication Data
US 2012/0081045 A1    Apr. 5, 2012

(51) Int. Cl.
*H02P 6/14* (2006.01)
(52) U.S. Cl.
USPC ................................................. 318/400.26
(58) Field of Classification Search
None
See application file for complete search history.

(56) References Cited

U.S. PATENT DOCUMENTS

| 7,242,159 | B2 * | 7/2007 | Ishikawa et al. | 318/139 |
| 2006/0114702 | A1 | 6/2006 | Yamada et al. | |
| 2008/0067973 | A1 * | 3/2008 | Ishikawa et al. | 320/104 |
| 2008/0281480 | A1 * | 11/2008 | Egami et al. | 701/22 |
| 2011/0279071 | A1 * | 11/2011 | Yamada | 318/400.02 |

FOREIGN PATENT DOCUMENTS

| JP | 07-154967 A | 6/1995 |
| JP | 2002-142451 A | 5/2002 |
| JP | 2004-112904 A | 4/2004 |
| JP | 2006-033923 A | 2/2006 |
| JP | 2006-187186 A | 7/2006 |
| JP | 2007-043852 A | 2/2007 |
| JP | 2007-166856 A | 6/2007 |
| JP | 2008-302763 A | 12/2008 |
| JP | 2008-312320 A | 12/2008 |

OTHER PUBLICATIONS

International Search Report dated Aug. 25, 2009, cited in PCT/JP2009/060029.

* cited by examiner

*Primary Examiner* — Lincoln Donovan
*Assistant Examiner* — Zoheb Imtiaz
(74) *Attorney, Agent, or Firm* — Sughrue Mion, PLLC

(57) ABSTRACT

In a voltage conversion device of a motor drive control device, switching-control is performed so as to enlarge an output allowable voltage range of the voltage conversion device restricted by a dead time in a switching operation for an upper arm and a lower arm performing power conversion by a switching operation. Accordingly, restriction in the output voltage from the voltage conversion device, caused by the dead time, can be suppressed.

15 Claims, 20 Drawing Sheets

CONTROL DEVICE FOR VOLTAGE CONVERSION DEVICE, VEHICLE INCORPORATING THE SAME, AND CONTROL METHOD FOR VOLTAGE CONVERSION DEVICE

CROSS REFERENCE TO RELATED APPLICATIONS

This application is a National Stage of International Application No. PCT/JP2009/060029 filed Jun. 2, 2009, the contents of all of which are incorporated herein by reference in their entirety.

TECHNICAL FIELD

The present invention relates to a control device for a voltage conversion device, a vehicle incorporating the same, and a control method for a voltage conversion device. More particularly, the present invention relates to suppression of the output voltage restriction of a voltage conversion device generated by a dead time.

BACKGROUND ART

In recent years, attention is drawn to an electric powered vehicle incorporating a power storage device (for example, a secondary battery, capacitor and the like) to run using the driving force generated from the electric power stored in the power storage device, as an environment-friendly vehicle. Such an electric powered vehicle includes, for example, an electric car, a hybrid vehicle, a fuel cell vehicle, and the like.

Some of these electric powered vehicles may incorporate a motor generator for generating a driving force to run upon receiving electric power from the power storage device at the time of startup and/or acceleration, and for generating electric power by regenerative braking in a braking mode to store electric energy in the power storage device. In order to control the motor generator according to the running state, the electric powered vehicle is mounted with an inverter.

In order to stably supply electric power required by the inverter and that varies according to the vehicle status, such a vehicle may incorporate a voltage converter between the power storage device and inverter. By using the converter to boost the input voltage of the inverter higher than the output voltage of the power storage device for increasing the power output of the motor and also to lower the motor current than that of the same level output, the size as well as the cost of the inverter and motor can be reduced.

Japanese Patent Laying-Open No. 2006-187186 (Patent Literature 1) discloses an approach of reducing the carrier frequency employed in switching-control of a switching element in a voltage conversion device for a motor drive device when the switching element of the voltage conversion device is affected by the dead time in the region where the voltage command value of the voltage conversion device is in the vicinity of the power supply voltage.

According to this approach, oscillation in the output voltage occurs as a result of not being able to ensure the ON duty that is the essential target due to the dead time in the region where the voltage command value of the voltage conversion device is in the vicinity of the power supply voltage, i.e. the ON duty of the upper arm of the voltage conversion device is in the vicinity of 1.0. The approach allows oscillation in the output voltage of the voltage conversion device to be suppressed.

CITATION LIST

Patent Literature

PTL 1: Japanese Patent Laying-Open No. 2006-187186
PTL 2: Japanese Patent Laying-Open No. 2008-302763
PTL 3: Japanese Patent Laying-Open No. 2004-112904

SUMMARY OF INVENTION

Technical Problem

In power conversion devices such as inverters and converters, development is seen to increase the carrier frequency in switching-control in order to downsize the device per se and suppress noise caused by switching.

If the carrier frequency in switching-control is increased, the switching period of the switching element will become shorter. This leads to increase in the ratio of the dead time during the switching period as compared to the case where the frequency is not increased since the dead time at one switching operation will not change if the operating speed of the switching element is the same. As a result, there is a possibility of the desired ON duty not being ensured even if the ON duty does not correspond to a region extremely close to 1.0. There is a problem that the range of voltage that can be output from the voltage conversion device is restricted.

The present invention is directed to solving such a problem. An object of the present invention is to suppress restriction in the output voltage of a voltage conversion device in a motor drive control device caused by a dead time.

Solution to Problem

A control device for a voltage conversion device according to the present invention is directed to controlling the voltage conversion device capable of voltage conversion between a power storage device and a load device. The voltage conversion device includes a first switching element and a second switching element connected in series between an electric power line and a ground line of the load device to perform voltage conversion by a switching operation. The switching operation includes a dead time identified as a period of time during which both the first and second switching elements are at an off state. The control device includes a frequency setting unit setting a carrier frequency of the switching operation, and a drive control unit configured to control switching of the first and second switching elements based on a voltage command value of voltage conversion and the carrier frequency. The drive control unit controls switching of the first and second switching elements so as to enlarge an output allowable voltage range of the voltage conversion device restricted by the dead time, based on information related to electric power input to and output from the voltage conversion device.

The information related to electric power input to and output from the voltage conversion device is preferably a target duty of the first and second switching elements. The drive control unit includes a target value computing unit configured to compute the target duty based on a voltage command value, and a reference value computing unit configured to compute a duty range defining the output allowable voltage range based on the carrier frequency and dead time. The drive control unit carries out switching control so as to enlarge the output allowable voltage range when the target duty exceeds the duty range.

Preferably, the drive control unit further includes a frequency modifying unit configured to reduce the carrier frequency when the target duty exceeds the duty range.

Preferably, the drive control unit further includes a selecting unit configured to select one of the first and second switching elements when the target duty exceeds the duty range, and select both of the first and second switching elements when the target duty is within the duty range, and a drive command generating unit generating a drive command for the switching element selected by the selecting unit.

Further preferably, the selecting unit selects the second switching element when the target duty is higher than an upper limit of the duty range.

Further preferably, the selecting unit selects the first switching element when the target duty is lower than a lower limit of the duty range.

Preferably, the frequency setting unit sets the carrier frequency variable based on the information related to the electric power input to and output from the voltage conversion device.

Also preferably, the information related to the electric power input to and output from the voltage conversion device includes at least one of an output electric power, an output voltage, and an output current of the power storage device.

Preferably, the voltage conversion device further includes a reactor provided at a path coupling a connection node of the first and second switching elements and a positive electrode terminal of the power storage device. The information related to the electric power input to and output from the voltage conversion device includes a reactor current flowing to the reactor.

Preferably, the information related to the electric power input to and output from the voltage conversion device includes electric power supplied to the load device.

A vehicle according to the present invention includes a power storage device, a rotating electric machine, an inverter, a voltage conversion device, and a control device. The rotating electric machine generates a driving force to drive the vehicle. The inverter drives the rotating electric machine. The voltage conversion device is configured to be capable of voltage conversion between the power storage device and inverter. The control device controls the voltage conversion device. The voltage conversion device includes a first switching element and a second switching element connected in series between an electric power line and a ground line of the load device to perform voltage conversion by a switching operation. The switching operation includes a dead time identified as a period of time during which both the first and second switching elements are at an off state. Furthermore, the control device includes a frequency setting unit setting a carrier frequency of the switching operation, and a drive control unit configured to control switching of the first and second switching elements based on a voltage command value of voltage conversion and the carrier frequency. The drive control unit controls switching of the first and second switching elements so as to enlarge an output allowable voltage range of the voltage conversion device restricted by the dead time, based on information related to electric power input to and output from the voltage conversion device.

The information related to electric power input to and output from the voltage conversion device is preferably a target duty of the first and second switching elements. The drive control unit includes a target value computing unit configured to compute the target duty based on a voltage command value, and a reference value computing unit configured to compute a duty range defining the output allowable voltage range based on the carrier frequency and dead time. The drive control unit carries out switching control so as to enlarge the output allowable voltage range when the target duty exceeds the duty range.

Preferably, the drive control unit further includes a frequency modifying unit configured to reduce the carrier frequency when the target duty exceeds the duty range.

Preferably, the drive control unit further includes a selecting unit configured to select one of the first and second switching elements when the target duty exceeds the duty range, and select both of the first and second switching elements when the target duty is within the duty range, and a drive command generating unit generating a drive command for the switching element selected by the selecting unit.

A control method for a voltage conversion device of the present invention is directed to controlling a voltage conversion device capable of voltage conversion between a power storage device and a load device. The voltage conversion device includes a first switching element and a second switching element connected in series between an electric power line and a ground line of the load device to perform voltage conversion by a switching operation. The switching operation includes a dead time identified as a period of time during which both the first and second switching elements are at an off state. The control method for a voltage conversion device includes the steps of setting a carrier frequency of a switching operation, controlling switching of the first and second switching elements based on a voltage command value of voltage conversion and the carrier frequency, and controlling switching of the first and second switching elements so as to enlarge an output allowable voltage range of the voltage conversion device restricted by a dead time, based on information related to the electric power input to and output from the voltage conversion device.

Advantageous Effects of Invention

In a voltage conversion device of a motor drive control device according to the present invention, restriction in the output voltage of the voltage conversion device caused by a dead time can be suppressed.

DESCRIPTION OF EMBODIMENTS

Figure 1:
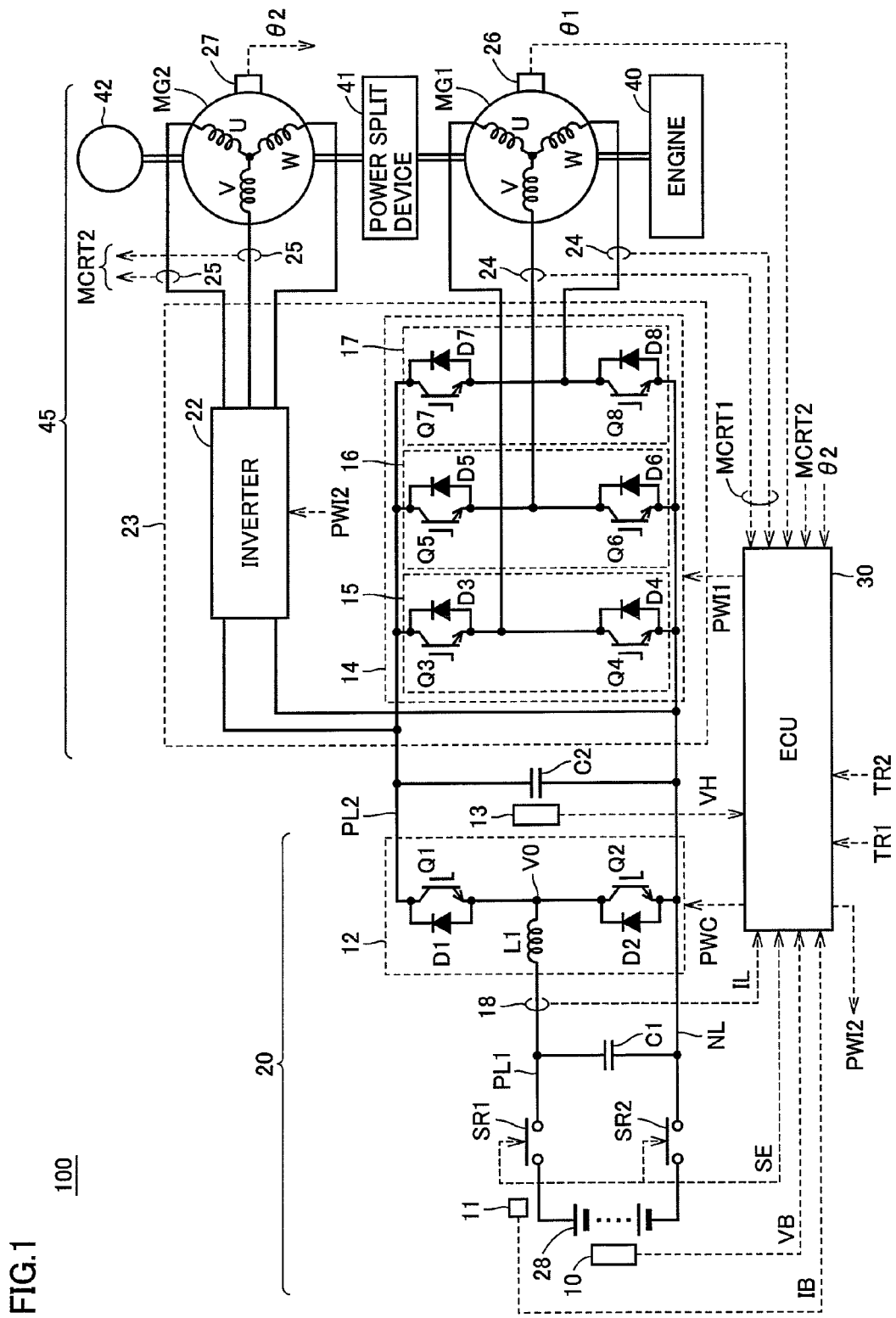
FIG. 1 is a diagram of an entire configuration of a hybrid vehicle incorporating a motor drive control system to which a control device for an AC electric motor is applied according to a first embodiment.

Embodiments of the present invention will be described in detail hereinafter with reference to the drawings. In the drawings, the same or corresponding elements have the same reference characters allotted, and description thereof will not be repeated.

First Embodiment

FIG. 1 is a diagram of an entire configuration of a hybrid vehicle 100 incorporating a motor driving control system to which a control device of an AC electric motor is applied according to the first embodiment. Although the first embodiment is described based on an example of a hybrid vehicle incorporating an engine and a motor generator as a vehicle 100, the configuration of vehicle 100 is not limited thereto. Any vehicle that can run by the electric power from a power storage device is applicable. Vehicle 100 includes, for example, an electric car, a fuel cell car, and the like, other than a hybrid vehicle.

Although the present embodiment will be described based on a configuration in which a motor driving control system is applied to a vehicle, the present motor driving control system can be applied to an apparatus other than a vehicle as long as it is driven by an AC electric motor, Referring to FIG. 1, vehicle 100 includes a DC voltage generating unit 20, a load device 45, and a smoothing capacitor C2, and a control device (hereinafter, also referred to as ECU: electric control unit) 30.

DC voltage generating unit 20 includes a power storage device 28, system relays SR1 and SR2, a smoothing capacitor C1, and a converter 12.

Power storage device 28 is typically configured including a secondary battery such as of nickel hydride or lithium ions, an electrical double layer capacitor, or the like. DC voltage VB output from and DC current IB that is input to or output from power storage device 28 are detected by a voltage sensor 10 and a current sensor 11, respectively. Voltage sensor 10 and current sensor 11 output the detected DC voltage VB and DC current IB to ECU 30.

System relay SR1 is connected between the positive electrode terminal of power storage device 28 and an electric power line PL1. System relay SR2 is connected between the negative electrode terminal of power storage device 28 and a ground line NL. System relays SR1 and SR2 are controlled by a signal SE from ECU 30 to switch between supply and disconnection of electric power from power storage device 28 to converter 12.

Converter 12 includes a reactor L1, an upper arm including switching element Q1 and a diode D1, and a lower arm including switching element Q2 and a diode D2. Switching elements Q1 and Q2 are connected in series between an electric power line PL2 and ground line NL. Switching elements Q1 and Q2 are controlled by a switching control signal PWC from ECU 30.

For a switching element in the present embodiment, an IGBT (Insulated Gate Bipolar Transistor), an electric power MOS (Metal Oxide Semiconductor) transistor, an electric power bipolar transistor, and the like can be employed. Antiparallel diodes D1 and D2 are arranged with respect to switching elements Q1 and Q2. Reactor L1 is connected between a connection node V0 of switching elements Q1 and Q2 and electric power line PL1. Smoothing capacitor C2 is connected between electric power line PL2 and ground line NL.

Current sensor 18 detects a reactor current flowing through reactor L1 and outputs a detection value IL thereof to ECU 30. In the present embodiment, it is assumed that reactor current IL is positive in the direction from power storage device 28 towards load device 45, and negative in the direction from load device 45 towards power storage device 28.

Load device 45 includes an inverter 23, motor generators MG1 and MG2, an engine 40, a power split device 41, and a drive wheel 42. Inverter 23 includes an inverter 14 to drive motor generator MG1, and an inverter 22 to drive motor generator MG2. It is not obligatory to include two sets of inverters and motor generators, as shown in FIG. 1. A configuration incorporating only one set such as inverter 14 and motor generator MG1, or inverter 22 and motor generator MG2, may be employed.

Motor generators MG1 and MG2 receive the AC power supplied from inverter 23 to generate a rotational driving force to drive the vehicle. Motor generators MG1 and MG2 also receive an externally-applied rotary force to generate AC power by a regenerative torque command from ECU 30 and provide a regenerative braking force to vehicle 100.

Motor generators MG1 and MG2 are also coupled to engine 40 via power split device 41. Control is provided such that the driving force generated by engine 40 and the driving force generated by motor generators MG1 and MG2 attain an optimum ratio. Further, one of motor generators MG1 and MG2 may be driven as a dedicated electric motor, and the other may be driven as a dedicated power generator. In the first embodiment, it is assumed that motor generator MG1 functions as a power generator driven by engine 40, whereas motor generator MG2 functions as an electric motor to move drive wheel 42.

Power split device 41 employs a planetary gear to split the power from engine 40 to drive wheel 42 and motor generator MG1.

Inverter 14 receives boosted voltage from converter 12 to drive motor generator MG1 to start up engine 40, for example. Inverter 14 outputs to converter 12 the regenerative power generated at motor generator MG1 by the mechanical power transmitted from engine 40. At this stage, converter 12 is controlled by ECU 30 to operate as a voltage-down circuit.

Inverter 14 is configured including U-phase upper and lower arms 15, V-phase upper and lower arms 16, and W-phase upper and lower arms 17, provided in parallel between electric power line PL2 and ground line NL. The upper and lower arms of each phase are formed of switching elements connected in series between electric power line PL2 and ground line NL. For example, switching elements Q3 and Q4 constitute U-phase upper and lower arms 15. Switching elements Q5 and Q6 constitute V-phase upper and lower arms 16. Switching elements Q7 and Q8 constitute W-phase upper and lower arms 17. Anti-parallel diodes D3-D8 are connected to switching elements Q3-Q8, respectively. Switching elements Q3-Q8 are controlled by a switching control signal PWI from ECU 30.

Typically, motor generator MG1 is a 3-phase permanent magnet type synchronous electric motor having one end of the three coils of the U, V and W-phases connected in common to a neutral point. The other end of each phase coil is connected to a connection node of the switching elements of upper and lower arms 15-17 of each phase.

Inverter 22 is connected in parallel with inverter 14 to converter 12.

Inverter 22 converts the DC voltage output from converter 12 into a 3-phase alternating current for output to motor generator MG2 that actuates drive wheel 42. In accordance with regenerative braking, inverter 22 outputs to converter 12 the regenerative power generated at motor generator MG2. At this stage, converter 12 is controlled by ECU 30 to operate as a voltage-down circuit. The internal configuration of inverter 22 is similar to that of inverter 14 not shown. Therefore, detailed description thereof will not be repeated.

Converter 12 is controlled basically such that switching elements Q1 and Q2 are rendered on and off in a complementary and alternate manner within each switching period. Converter 12 boosts DC voltage VB supplied from power storage device 28 to the level of DC voltage VH (this DC voltage equivalent to the input voltage to inverter 14 is hereinafter also referred to as "system voltage") in a boosting operation. This boosting operation is performed by supplying the electromagnetic energy stored at reactor L1 during an ON period of switching element Q2 to electric power line PL2 via switching element Q1 and anti-parallel diode D1.

In a voltage-down operation, converter 12 down-converts DC voltage VH to DC voltage VB. This voltage-down operation is performed by supplying the electromagnetic energy stored at reactor L1 during the ON period of switching element Q1 to ground line NL via switching element Q2 and anti-parallel diode D2.

The voltage conversion ratio (ratio of VH and VB) in these boosting operation and voltage-down operation is controlled by the ON period of switching elements Q1 and Q2 in the switching period (duty ratio). By fixing switching elements Q1 and Q2 at an ON and OFF state, respectively, VH=VB (voltage conversion ratio=1.0) can be established.

Smoothing capacitor C2 smoothes the DC voltage from converter 12 and provides the smoothed DC voltage to inverter 23. Voltage sensor 13 detects the voltage across smoothing capacitor C2, i.e. system voltage VH, and provides the detection value thereof to ECU 30.

When the torque command value of motor generator MG1 is positive (TR1>0), inverter 14 drives motor generator MG1 to output positive torque by converting the DC voltage received from smoothing capacitor C2 into an AC voltage through the switching operation of switching elements Q3-Q8 in response to a switching control signal PWI1 from ECU 30. When the torque command value of motor generator MG1 is zero (TR1=0), inverter 14 drives motor generator MG1 such that the torque becomes zero by converting the DC voltage into AC voltage through a switching operation in response to switching control signal PWI1. Accordingly, motor generator MG1 is driven to generate torque of zero or positive level specified by torque command value TR1.

In a regenerative braking mode of vehicle 100, torque command value TR1 of motor generator MG1 is set negative (TR1<0). In this case, inverter 14 converts the AC voltage generated by motor generator MG1 into DC voltage through a switching operation in response to switching control signal PWI1 and supplies the converted DC voltage (system voltage) to converter 12 via smoothing capacitor C2. As used herein, regenerative braking includes braking in association with regeneration when the driver of the electric powered vehicle operates the foot brake as well as reducing the speed of the vehicle (or ceasing acceleration) while effecting regeneration by rendering the accelerator pedal off during running without operating the foot brake.

Inverter 22 similarly receives a switching control signal PWI2 from ECU 30 corresponding to a torque command value of motor generator MG2 to effect a switching operation in response to switching control signal PWI2 such that DC voltage is converted into AC voltage to drive motor generator MG2 so as to attain a predetermined torque.

Current sensors 24 and 25 detect motor currents MCRT1 and MCRT2 flowing to motor generators MG1 and MG2 to output the detected motor current to ECU 30. Since the sum of the instantaneous values of the currents of each of the U-phase, V-phase and W-phase is zero, it is sufficient for current sensors 24 and 25 to be arranged to detect the motor currents of two phases, as shown in FIG. 1.

Rotation angle sensors (resolver) 26 and 27 detect rotation angles $\theta 1$ and $\theta 2$ of motor generators MG1 and MG2 to transmit the detected rotation angles $\theta 1$ and $\theta 2$ to ECU 30. At ECU 30, the rotational speeds MRN1 and MRN2 and angular speeds $\omega 1$ and $\omega 2$ (rad/s) of motor generators MG1 and MG2 can be calculated based on rotation angles $\theta 1$ and $\theta 2$. By directly calculating rotation angles $\theta 1$ and $\theta 2$ from the motor voltage and current at ECU 30, rotation angle sensors 26 and 27 are dispensable.

Although not shown, ECU 30 includes a CPU (Central Processing Unit), a storage device, and an input/output buffer to control each component of vehicle 100. Control thereof is not limited to processing implemented in software, and dedicated hardware (electronic circuit) may be developed for the processing.

As a typical function, ECU 30 controls the operation of converter 12 and inverter 23, based on the input torque command values TR1 and TR2, DC voltage VB detected by voltage sensor 10, direct current IB detected by current sensor 11, system voltage VH detected by voltage sensor 13, motor currents MCRT1 and MCRT2 from current sensors 24 and 25, rotation angles θ1 and θ2 from rotation angle sensors 26 and 27, and the like such that torque according to torque command values TR1 and TR2 is output from motor generators MG1 and MG2, respectively. In other words, switching control signals PWC, PWI1 and PWI2 directed to controlling converter 12 and inverter 23, as set forth above, are generated and provided to converter 12 and inverter 23.

In a boosting operation mode of converter 12, ECU 30 feedback-controls system voltage VH and generates a switching control signal PWC such that system voltage VH matches the voltage command value.

When vehicle 100 enters a regenerative braking mode, ECU 30 generates and provides to inverter 23 switching control signals PWI1 and PWI2 such that the AC voltage generated at motor generators MG1 and MG2 is converted into DC voltage. Accordingly, inverter 23 converts the AC voltage generated at motor generators MG1 and MG2 into DC voltage for supply to converter 12.

Moreover, when vehicle 100 enters a regenerative braking mode, ECU 30 also generates and provides to converter 12 a switching control signal PWC such that the DC voltage supplied from inverter 23 is down-converted. Accordingly, the AC voltage generated by motor generators MG1 and MG2 is converted into DC voltage, and further down-converted to be supplied to power storage device 28.

A positive state of a reactor average current that is the average of the reactor current flowing through reactor L1 in the time axis direction corresponds to a power running state in which motor generators MG1 and MG2 are driven by the electric power from power storage device 28. A negative state of the reactor average current corresponds to a regeneration state in which power storage device 28 is charged with the electric power generated by motor generators MG1 and MG2. The state (power running, regeneration) of each of motor generators MG1 and MG2 may differ depending upon the running state of vehicle 100. For example, there may be the case where motor generator MG1 generates power in a regeneration state while drive wheel 42 is driven with motor generator MG2 in a power running state. In the following description, the case where electric power is supplied from power storage device 28 towards load device 45 is generically called a "power running state", whereas the case where power storage device 28 is charged with the electric power generated at load device 45 is generically referred to as a "regeneration state".

Figure 2:
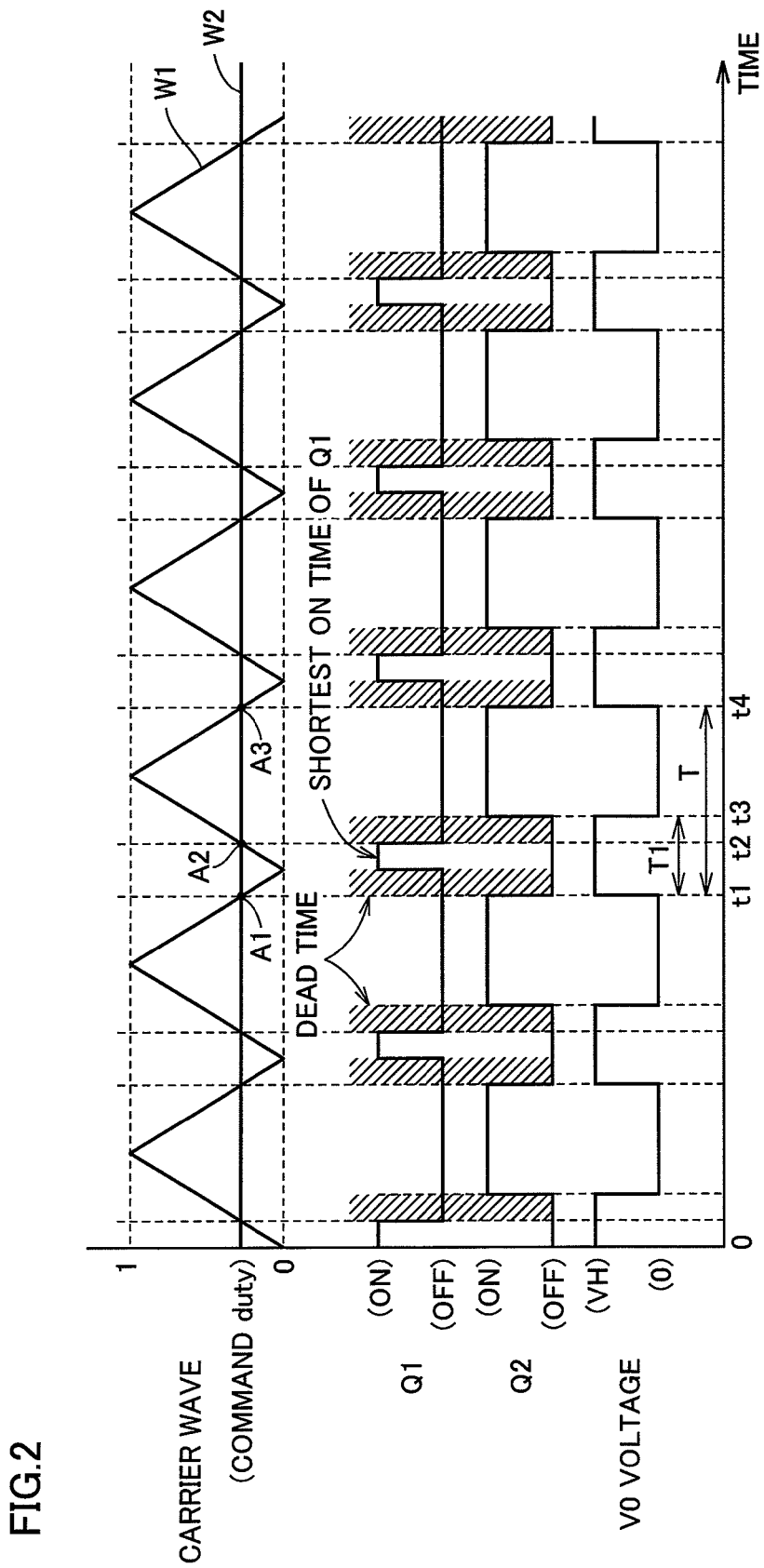
FIG. 2 is a timing chart to describe the effect of a dead time in switching-control.

FIG. 2 is a timing chart to describe the effect of a dead time in switching control. In FIG. 2, the horizontal axis shows the time; the vertical axis shows the conveying wave (carrier wave) in switching control, the operating states of switching elements Q1 and Q2, and the voltage at connection node V0. FIG. 2 corresponds to an example in which load device 45 is in a power running state, and at a high load where reactor current IL is constantly positive.

Referring to FIG. 2, the drive commands of switching elements Q1 and Q2 are basically generated by comparison between a carrier wave and a command duty. For example, when the command duty is W2 in FIG. 2, switching element Q1 is controlled to be ON (switching element Q2 is OFF) during the period of time from a crossing point A1 to a crossing point A2 of carrier wave W1 and command duty W2 (that is, from time t1 to t2), and to be OFF (switching element Q2 is ON) during the period of time from crossing point A2 to crossing point A3 (that is, from time t2 to t4) in one switching period T from time t1 to t4.

Therefore, when the command duty becomes 1.0, switching element Q1 that is the upper arm is controlled to be constantly ON whereas switching element Q2 is controlled to be constantly OFF. In contrast, when the command duty becomes 0.0, switching element Q1 that is the upper arm is controlled to be constantly OFF whereas switching element Q2 is controlled to be constantly ON.

However, in practical control, taking into account the operating speed of the switching elements, there is provided a term where, subsequent to one of the switching elements rendered OFF, the other switching element is prohibited from being rendered ON for a predetermined time (dead time) in order to prevent the event of both switching elements Q1 and Q2 from becoming ON at the same time to cause shorting between electric power line PL2 and ground line NL.

Further, since the switching element per se needs an operating time to be driven from OFF to ON or from ON to OFF, the shortest ON time (or shortest OFF time) is required. Accordingly, there may be a case where the duty in practice (hereinafter, also referred to as "actual duty") is restricted by the shortest ON time (or shortest OFF time) of the switching elements and the dead time.

Referring to FIG. 2, the OFF time of switching element Q2 should essentially correspond to the term from crossing point A1 to crossing point A2 (from time t1 to t2). However, switching element Q2 takes an OFF state from time t1 to t3 due to the dead time and the shortest ON time of switching element Q1.

During the dead time term, the direction of the current flowing through circuitry differs depending upon the operating state of the load, as will be described in detail afterwards with reference to FIGS. 3 to 8.

Since reactor current IL is constantly positive in FIG. 2, as described above, current flows towards the upper arm side even during the dead time term.

Therefore, the voltage at connection node V0 attains the level of system voltage VH from time t1 to t3 (period of time T1). Therefore, the actual duty restricted by the dead time and the shortest ON time of the switching element can be represented by the ratio of the voltage at connection node V0 of switching elements Q1 and Q2 at the level of the system voltage during switching period T, i.e. T1/T.

Difference in the actual duty when the operating state of the load differs will be described hereinafter with reference to FIGS. 3-8.

Figure 3:
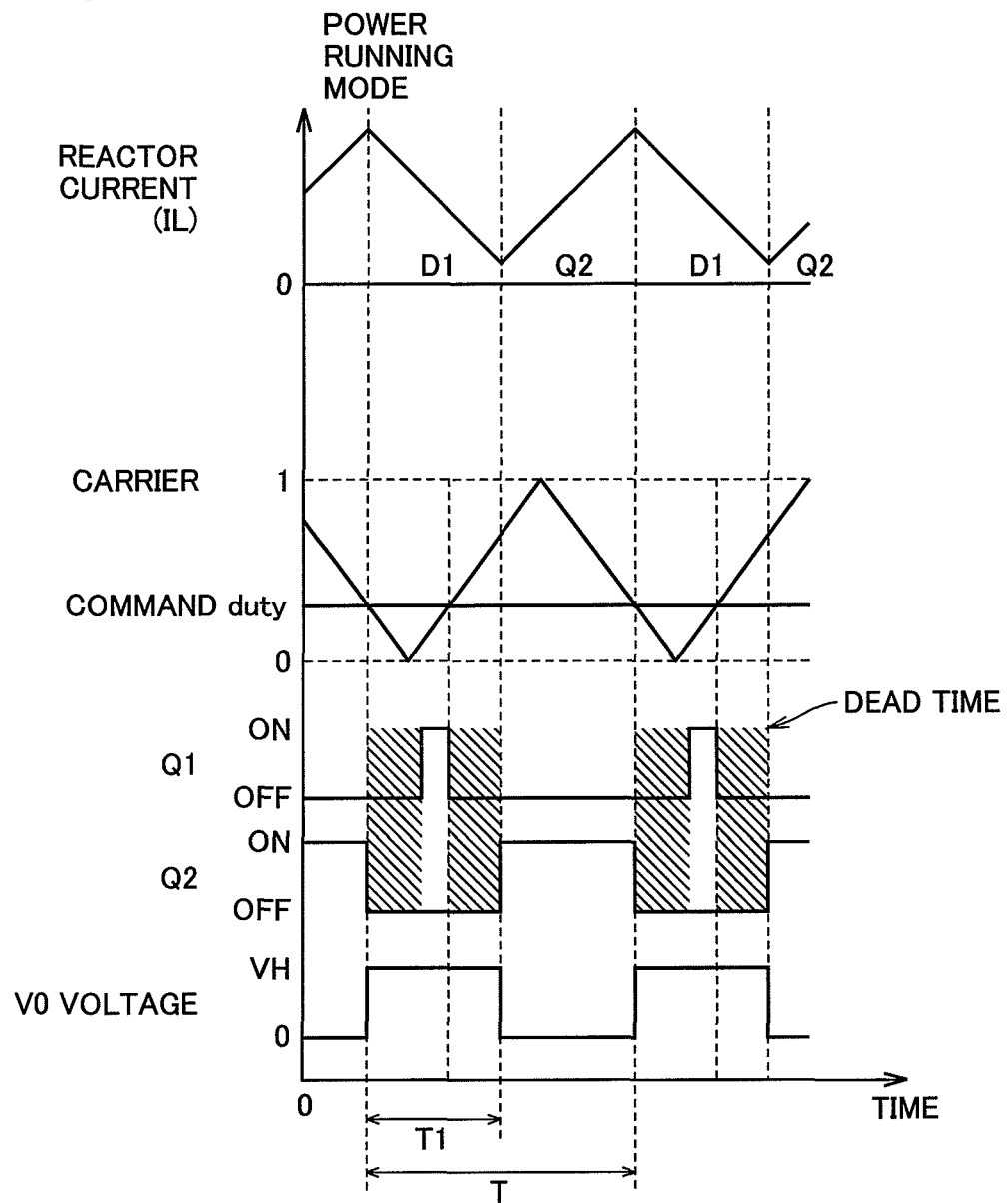
FIG. 3 is a timing chart to describe the actual duty when a load device is in a power running state and a reactor current is constantly positive.

FIG. 3 is a timing chart to describe the actual duty when load device 45 is in a power running state and reactor current IL is constantly positive, likewise of FIG. 2. In FIG. 3, time is plotted along the horizontal axis whereas reactor current IL, the carrier wave, the operating states of switching elements Q1 and Q2, and the voltage at connection node V0 are plotted along the vertical axis.

Although the drive commands of switching elements Q1 and Q2 are generated based on a comparison between the carrier wave and command duty, the actual operation is subjected to restriction by the dead time and shortest ON time of the switching element, as described above.

Figure 4:
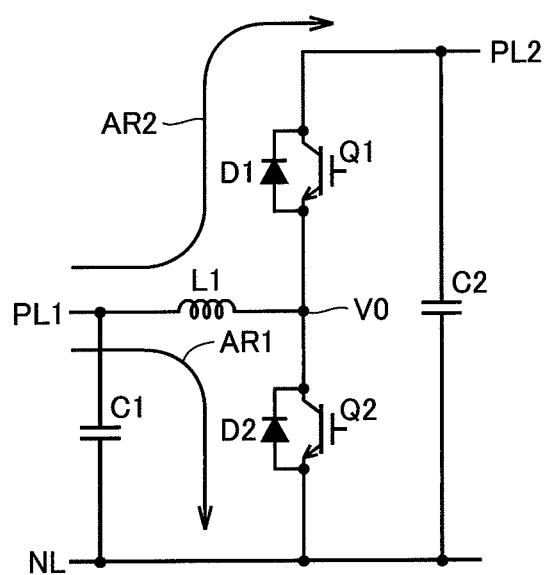
FIG. 4 is a diagram to describe a current flowing through converter in the event of FIG. 3.

FIG. 4 is a diagram to describe current flowing to converter 12 in the event of FIG. 3. With reference to FIGS. 3 and 4, in the case where switching element Q2 is ON in the event of FIG. 3, current flows in the direction from electric power line PL1 towards ground line NL via reactor L1 and switching element Q2, as indicated by the solid line arrow AR1 in FIG. 4. At this stage, positive energy is stored at reactor L1. Then, when switching element Q2 is rendered OFF, switching element Q1 is then rendered ON. However, in the event of FIG. 3, during the period of time where switching element Q2 is at an OFF state (in other words, the dead time term and ON term of switching element Q1) in the event of FIG. 3, current flows in the direction from reactor L1 towards electric power line PL2 via diode D1 (the solid line arrow AR2 in FIG. 4) by the positive energy stored at reactor L1.

Therefore, the voltage at connection node V0 is always at the level of system voltage VH during an OFF term of switching element Q2. Therefore, the actual duty is the ratio of the total time of the dead time and the ON time of switching element Q1 at switching period T.

Figure 5:
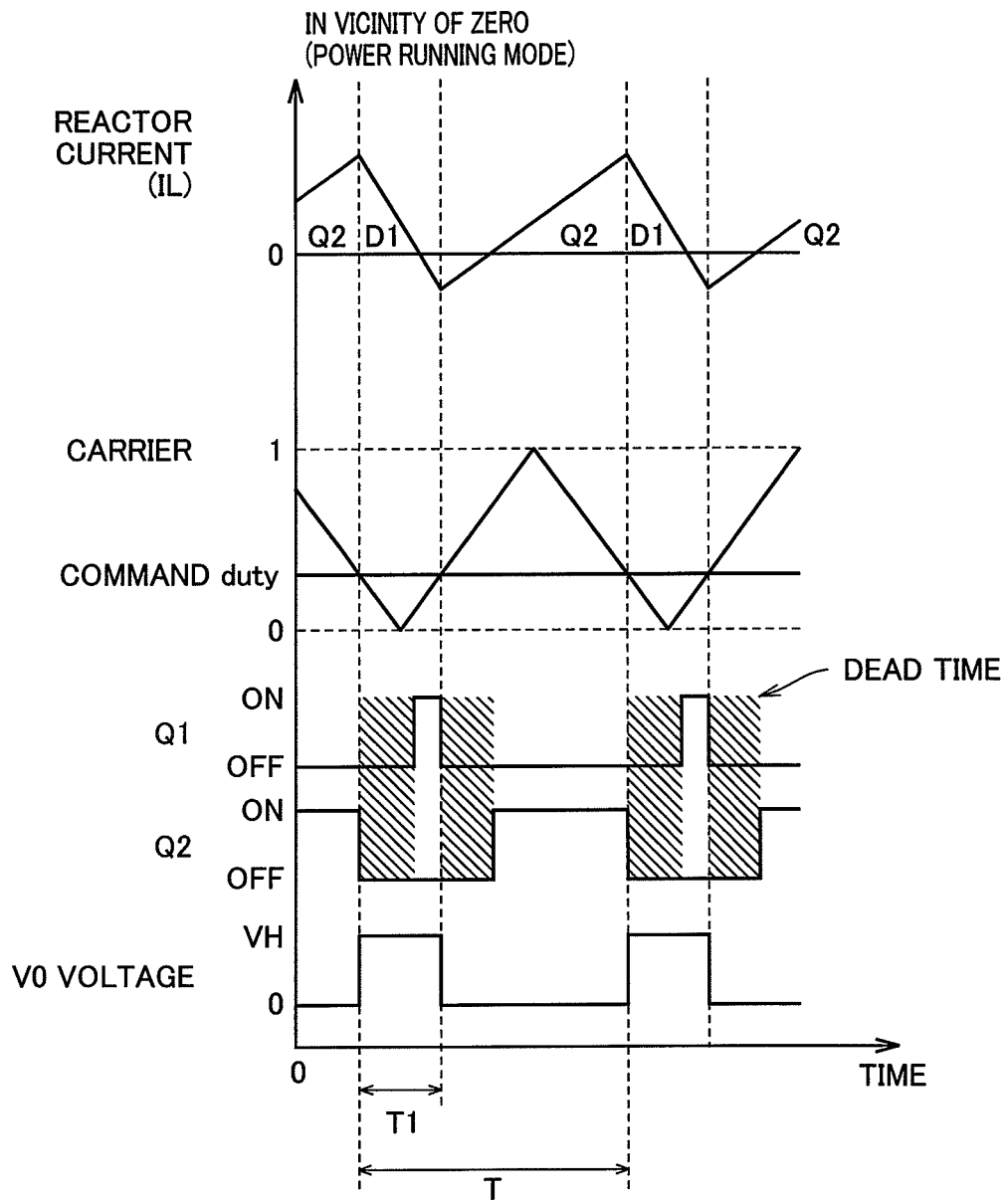
FIG. 5 is a timing chart to describe the actual duty in a low load mode in which the reactor current is close to zero in a power running state.

FIG. 5 is a timing chart to describe the actual duty when is in a low load mode with the reactor current close to zero although in a power running state. FIG. 5 represents a command duty similar to that of FIG. 3 provided that reactor current IL is switched from positive to negative, or from negative to positive, during the switching period.

Figure 6:
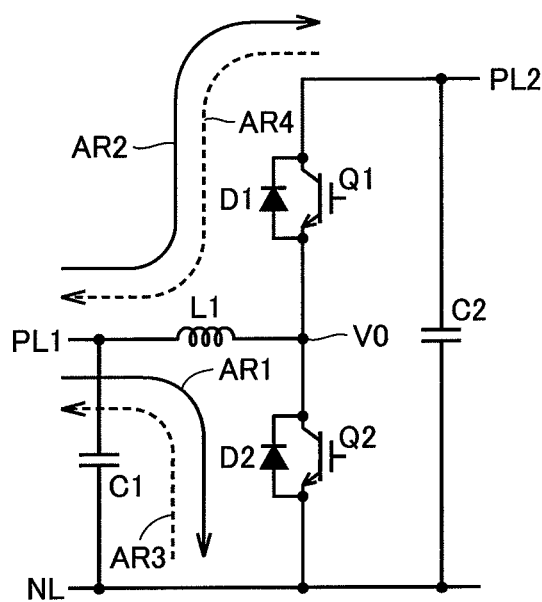
FIG. 6 is a diagram to describe a current flowing to the converter in the event of FIG. 5.

FIG. 6 is a diagram to describe a current flowing through converter 12 in the event of FIG. 5. With reference to FIGS. 5 and 6, reactor current IL is positive right after switching element Q2 is switched from ON to OFF. Therefore, current flows in the direction of solid line arrow AR2 in FIG. 6 via diode D1, likewise of the event of FIG. 3. Subsequently, when switching element Q1 attains an ON state and the current is reduced to become zero, current will now begin to flow in the direction from electric power line PL2 towards electric power line PL1 (broken line arrow AR4 in FIG. 6) via switching element Q1. Accordingly, negative energy is stored at reactor L1.

Then, during the dead time term starting from switching element Q1 rendered OFF and until switching element Q2 is rendered ON, and also until discharge of the negative energy stored at reactor L1 is completed after switching element Q2 is rendered ON, current flows in the direction from ground line NL towards reactor L1 via diode D2 (broken line arrow AR3 in FIG. 6).

Subsequently, when the discharge of the energy stored at reactor L1 is completed, the output electric power from power storage device 28 now causes the current to flow from electric power line PL1 towards ground line NL via reactor L1 and switching element Q2 (solid line arrow AR1 in FIG. 6). Accordingly, positive energy is stored at reactor L1.

Thus, when reactor current IL is switched from positive to negative, or from negative to positive, the voltage at ground node V0 is zero during the dead time term where reactor current IL is negative. Therefore, the actual duty is equivalent to the ratio of the total time of the ON time of switching element Q1 and the dead time starting from switching element Q2 rendered OFF until switching element Q1 is rendered ON in switching period T.

Figure 7:
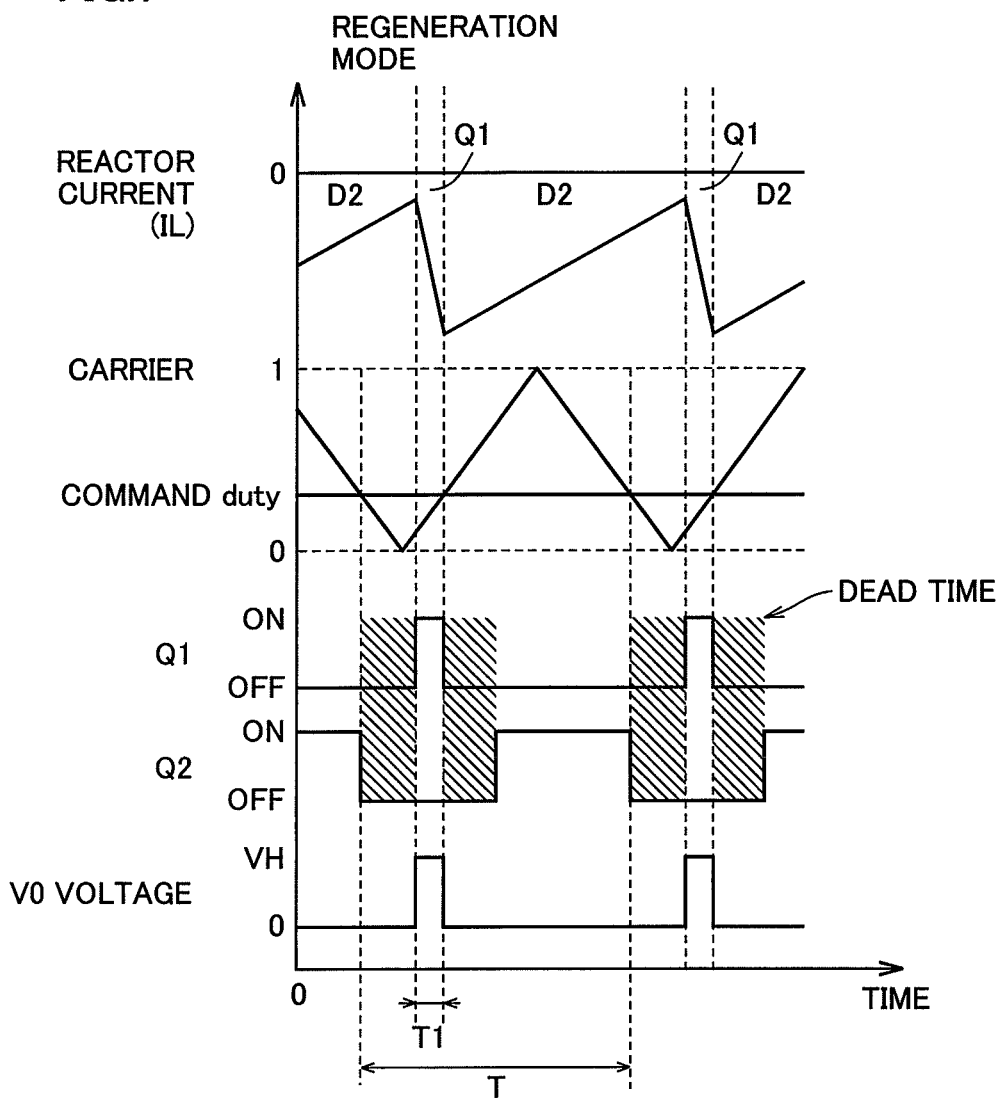
FIG. 7 is a timing chart to describe the actual duty when a load device is in a regeneration state and the reactor current is constantly negative.
Figure 8:
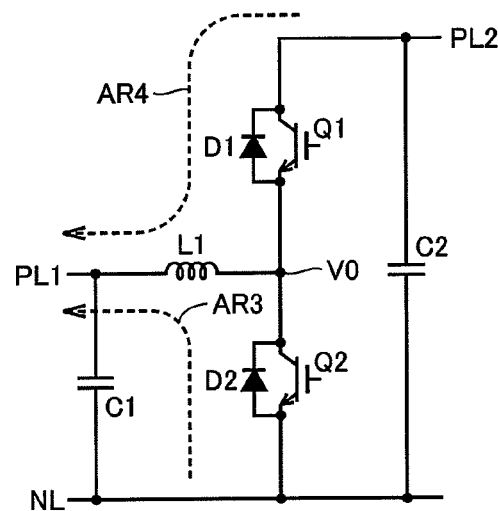
FIG. 8 is a diagram to describe a current flowing through the converter in the event of FIG. 7.

FIG. 7 is a timing chart to describe the actual duty when load device 45 is in a regeneration state and reactor current IL is constantly negative. FIG. 8 is a diagram to describe the current flowing through converter 12 in the event of FIG. 7. The command duty of FIG. 7 is similar to those in the events of FIGS. 3 and 5.

Referring to FIGS. 7 and 8, the current flows in a direction from electric power line PL2 towards reactor L1 via switching element Q1 (broken line arrow AR4 in FIG. 8) since reactor current IL is negative when switching element Q1 is ON.

Then, switching element Q1 is rendered OFF. During any of the following dead time term until switching element Q2 is rendered ON, the ON term of switching element Q2, and the dead time term until switching element Q1 is rendered ON after switching element Q2 attains an OFF state, current flows from ground line NL towards reactor L1 (broken line arrow AR3 in FIG. 8) via diode D2 since reactor current IL is negative.

Thus, in the event of FIG. 7, the period of time where the voltage at connection node V0 is at the level of system voltage VH is equivalent to only the term where switching element Q1 is ON. Therefore, the actual duty is the ratio of the ON time of switching element Q1 to switching period T.

Since the direction of the current flowing during the dead time term differs depending upon the state of the load, it will not be possible to achieve the command duty in the case where the ON duty is infringed by the dead time at the state where the command duty approximates 0 or 1.

Figure 9:
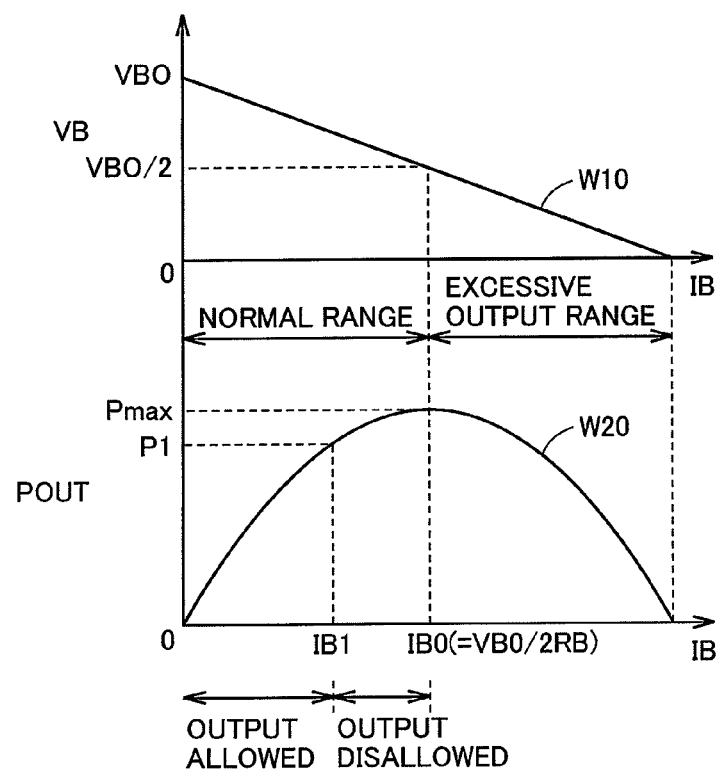
FIG. 9 represents the relationship of the output current of the power storage device with the output power and output voltage in a power running state.

FIG. 9 represents the relationship of output current IB with output power POUT and output voltage VB of power storage device 28. In FIG. 9, output current IB is plotted along the horizontal axis whereas output voltage VB (upper stage) and output power POUT (lower stage) are plotted along the vertical axis. Although the description set forth below is based on an example of a power running state, the same applies to the case of a regeneration state.

Referring to FIG. 9, output voltage VB of power storage device 28 can be expressed by the following equation (1), where VB0 is the open voltage, and RB is the internal resistance of power storage device 28.

$$VB = VB0 - IB \cdot RB \tag{1}$$

A graphic representation thereof forms the straight line W10 of the upper stage in FIG. 9.

Output power POUT of power storage device 28 can be expressed by the product of output voltage VB and output current IB.

$$POUT = VB \cdot IB \tag{2}$$

By inserting equation (1) into equation (2), the following equation (3) is provided.

$$POUT = (VB0 - IB \cdot RB) \cdot IB \tag{3}$$

A modification thereof gives equation (4).

$$POUT = -RB \cdot \{IB - (VB0/2RB)\}^2 + (VB0^2/4RB^2) \tag{4}$$

A graphic representation thereof forms a parabola such as a curve W20 in FIG. 9.

Since the power consumed by the internal resistance of power storage device 28 becomes great when output current IB is larger than IB0 (excessive output range), the output current is generally employed in the range from 0 to IB0 (normal range).

According to FIG. 9 and equation (4), the maximum power Pmax that can be output from power storage device 28 corresponds to the case where output current IB in FIG. 9 is equivalent to IB0 (=VB0/2RB). At this stage, the output voltage from power storage device 28 is VB0/2.

In other words, the maximum power can be output from power storage device 28 by setting the duty (VB/VH) to drive converter 12 at VB0/2VH.

However, as described with reference to FIGS. 3-8, the effect of the dead time of switching elements Q1 and Q2 may hinder achievement of the command duty since the ON duty will be infringed by the dead time. As a result, power cannot be output sufficiently from the power storage device 28. Therefore, there is a possibility that the desired system voltage VH cannot be achieved, leading to insufficient motive performance.

Figure 10:
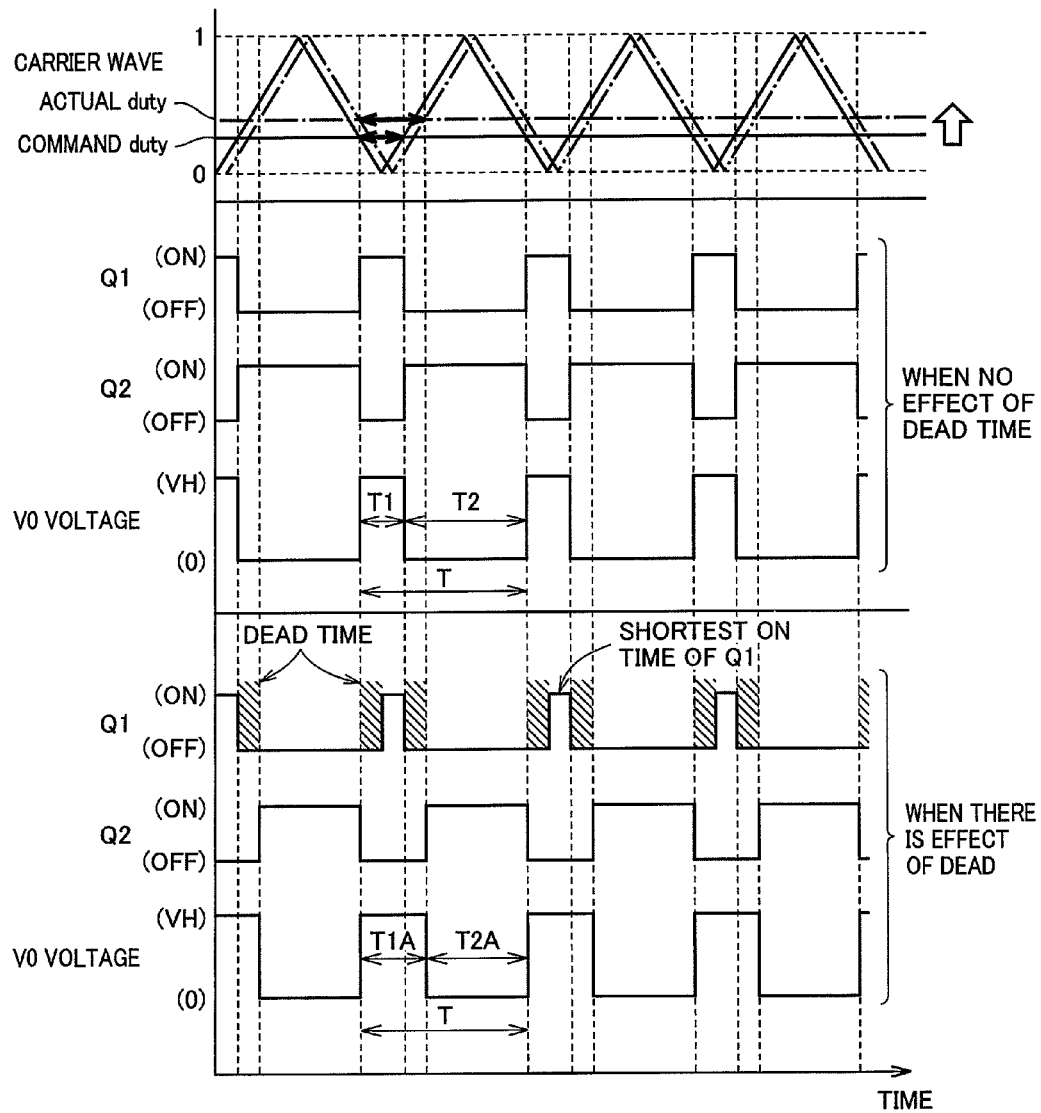
FIG. 10 is a timing chart comparing the duty in a power running state when there is an effect of the dead time and no effect of the dead time.

FIG. 10 is a timing chart comparing the duty in a power running state corresponding to the case where there is an effect of a dead time and no effect of a dead time. In FIG. 10, the upper stage represents the carrier wave. The middle stage represents an idealistic operating state of switching elements Q1 and Q2 when there is no effect of a dead time, and the voltage at connection node V0. The lower stage in FIG. 10 represents the operating state of switching elements Q1 and Q2 taking into account the dead time, and the voltage at connection node V0, in practice.

Since the duty when there is no effect of the dead time matches the command duty in FIG. 10, the duty is equivalent to the ratio of the ON time of switching element Q1 to switching period T (T1/T).

In the case where there is an effect of the dead time, the actual duty is T1A/T since current flows through diode D1 during the dead time term, as described with reference to FIG. 3.

Now, T1<T1A is established, so that the actual duty becomes higher than the command duty, as represented at the upper stage in FIG. 10. Therefore, the ON term of switching element Q2 (T2A) becomes shorter as compare to T2.

In the case where boosting is to be conducted by converter 12, the ON time of switching element Q2 must be lengthened to increase the energy stored at reactor L1 in order to achieve a large boosting ratio (VH/VB). However, if the actual duty is restricted by the dead time as set forth above, the energy stored at reactor L1 will be reduced, leading to the case where the desired boosting ratio may not be achieved.

Particularly in the case where the temperature of power storage device 28 is low as during the winter season and/or in cold weather regions, output voltage VB of power storage device 28 will be reduced. Accordingly, the boosting ratio required for target system voltage VH is increased. In the case where the target duty cannot be achieved, the power required for motor driving cannot be achieved, leading to the possibility of degradation in the motive performance.

Moreover, in recent years, development is seen in increasing the carrier frequency during switching-control in a power conversion device such as a converter and inverter in order to suppress noise caused by down sizing of the device per se and by switching. Accordingly, the ratio occupied by the dead time in the switching period becomes larger. Therefore, the possibility of not being able to achieve the desired boosting ratio will become higher.

In the first embodiment, converter driving control is performed to set the carrier frequency lower than that of the normal case when the target output voltage of converter 12 exceeds the actual settable voltage range due to the effect of the dead time of switching elements Q1 and Q2, i.e. when the command duty exceeds the settable actual duty range due to the effect of the dead time of switching elements Q1 and Q2.

Accordingly, the effect of the dead time can be lessened by lowering the carrier frequency in the case where the output voltage is restricted such as at the time of low temperature and the like. Thus, the target output voltage can be achieved. Moreover, the higher carrier frequency can be maintained in the range where the target output voltage is within the settable voltage range.

Figure 11:
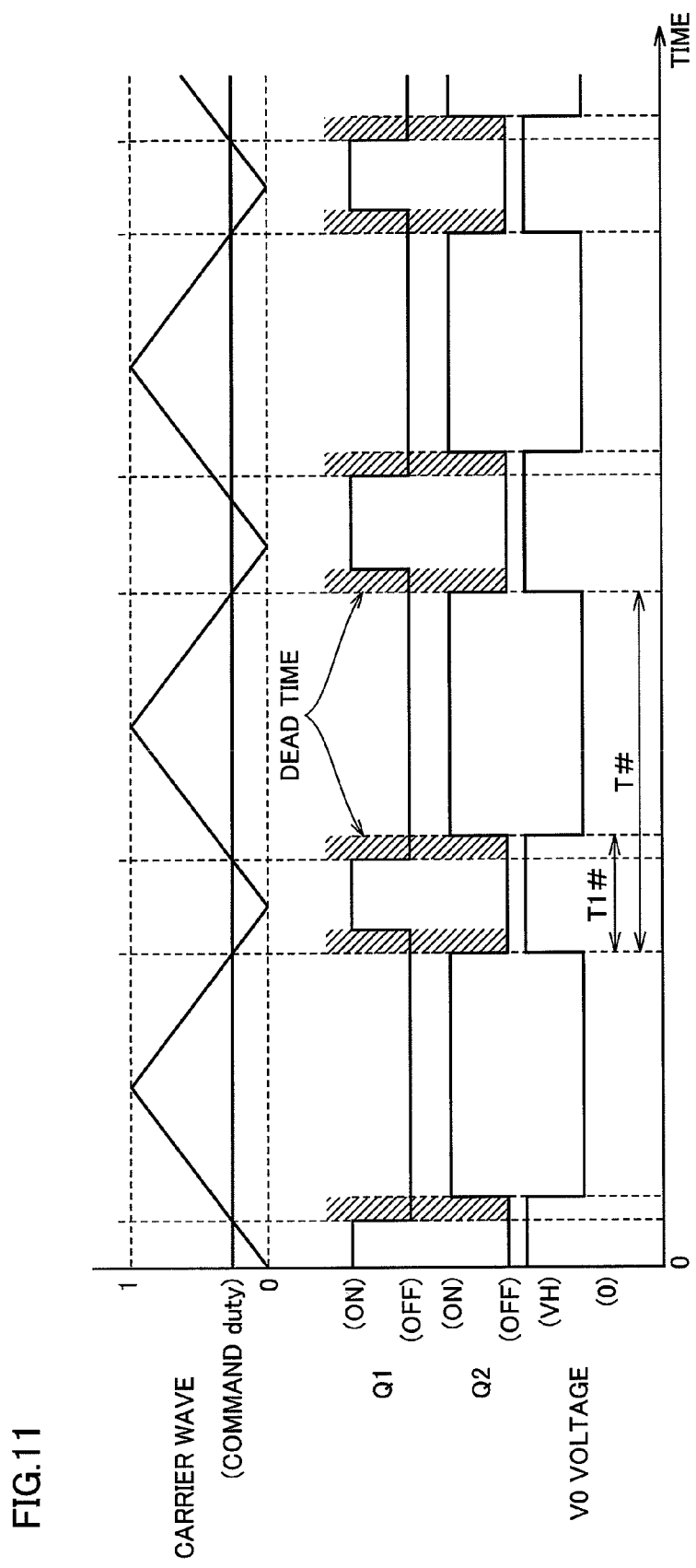
FIG. 11 is a timing chart to describe the actual duty when the converter driving control of a first embodiment is applied in the power running state of FIG. 2.

FIG. 11 is a timing chart to describe the actual duty when the converter driving control of the first embodiment is applied in the power running state of FIG. 2.

Referring to FIGS. 2 and 11, in the case where the converter driving control of the first embodiment is applied, the carrier frequency is set low as shown in FIG. 11 when the target output voltage of converter 12 exceeds the actual settable voltage range due to the effect of the dead time of switching elements Q1 and Q2. Accordingly, the switching period changes from T to T# (T<T#).

It is to be noted that the dead time setting, once made, does not have to be modified since the operating speed of switching elements Q1 and Q2 does not change. Therefore, the ratio of the dead time in switching period T# becomes smaller as compared to the case where the first embodiment is not applied. As a result, the achievable range of the actual duty (T1#/T#) is increased.

Figure 12:
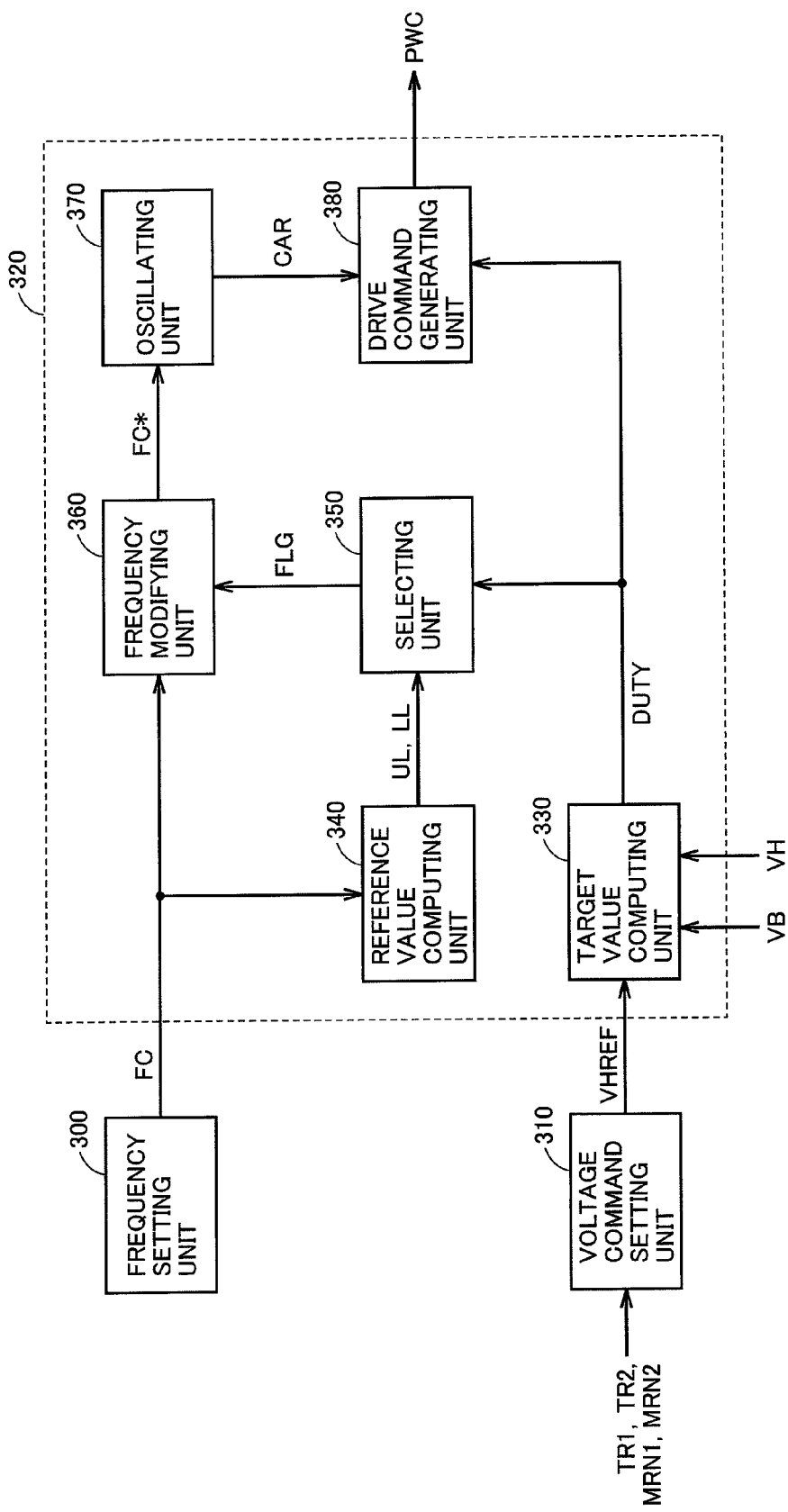
FIG. 12 is a functional block diagram to describe converter driving control executed at an ECU according to the first embodiment.
Figure 15:
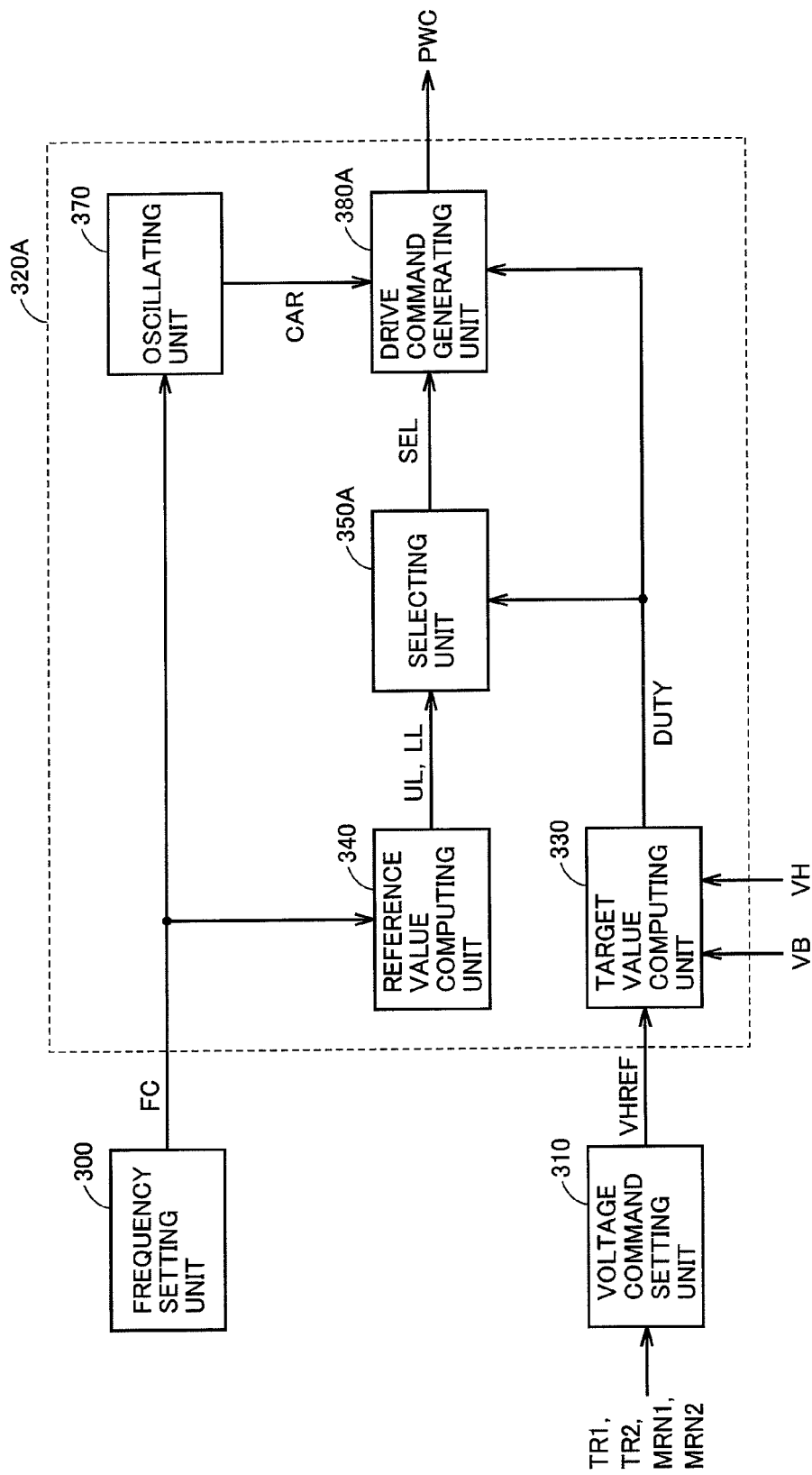
FIG. 15 is a functional block diagram to describe converter driving control executed at an ECU according to the second embodiment.
Figure 17:
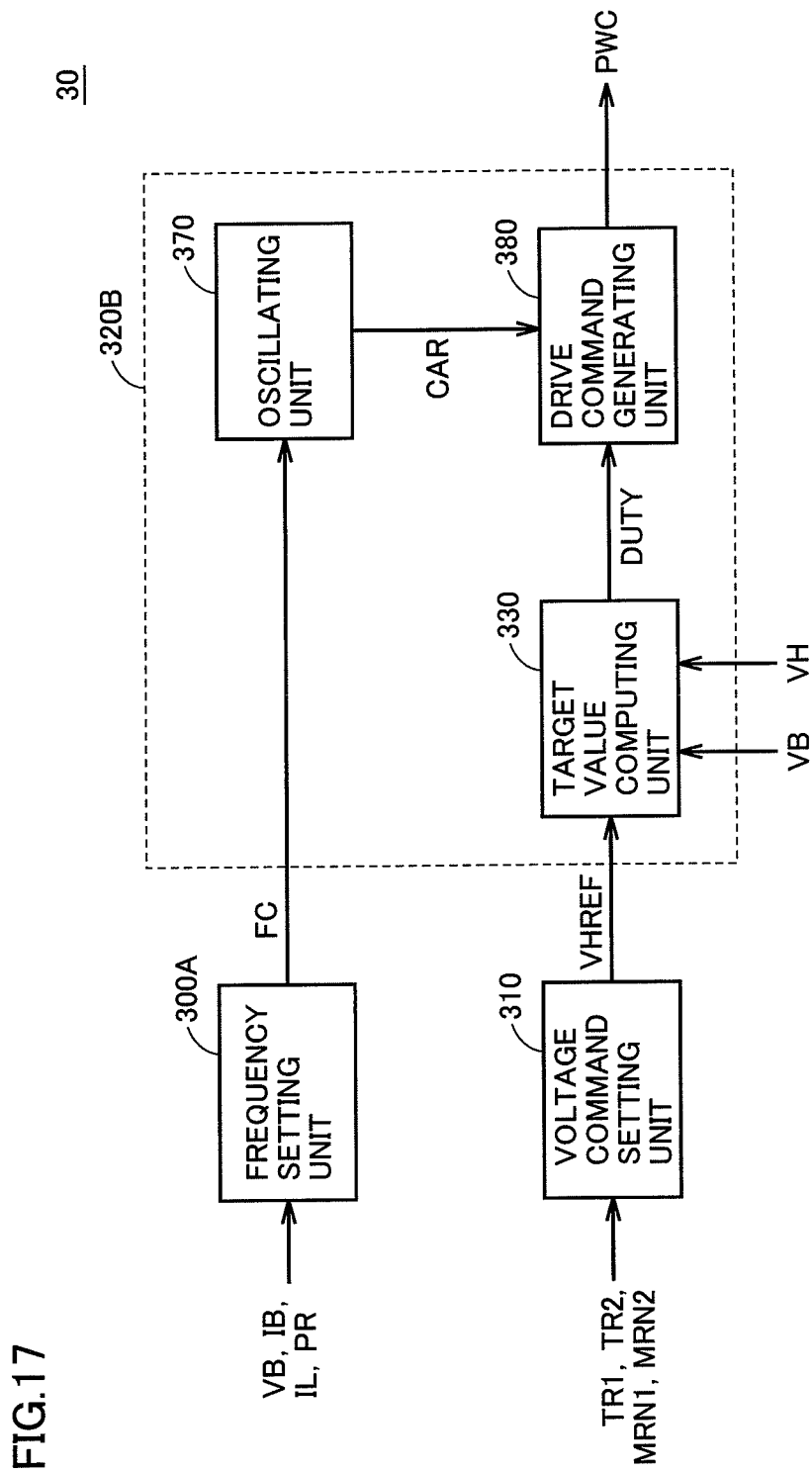
FIG. 17 is a functional block diagram to describe converter driving control executed by an ECU according to a third embodiment.
Figure 22:
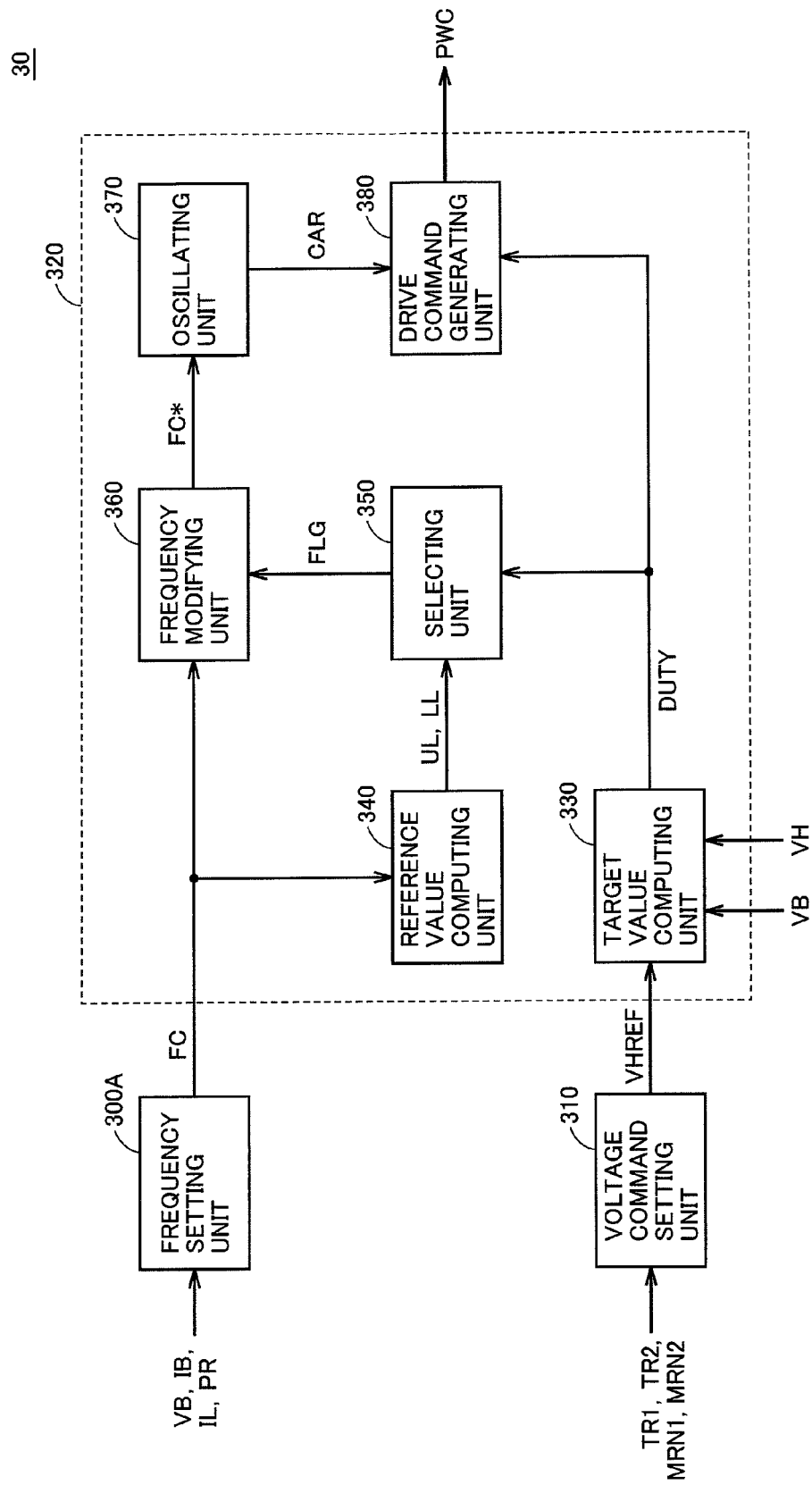
FIG. 22 is a functional block diagram to describe converter driving control executed by an ECU in the event of the first embodiment and third embodiment being combined.

FIG. 12 is a functional block diagram to describe the converter driving control executed at ECU 30 according to the first embodiment. Each functional block in the functional block diagrams of FIG. 12 and subsequent FIGS. 15, 17 and 22 is realized by processing implemented in hardware or software by ECU 30.

Referring to FIGS. 1 and 12, ECU 30 includes a frequency setting unit 300, a voltage command setting unit 310, and a drive control unit 320. Drive control unit 320 includes a target value computing unit 330, a reference value computing unit 340, a selecting unit 350, a frequency modifying unit 360, an oscillating unit 370, and a drive command generating unit 380.

Frequency setting unit 300 sets a preset carrier frequency FC. In the first embodiment, carrier frequency FC is a fixed value. Frequency setting unit 300 outputs the set carrier frequency FC to reference value computing unit 340 and frequency modifying unit 360.

Reference value computing unit 340 computes the upper limit UL and the lower limit LL of the settable range of actual duty taking into account the dead time, based on carrier frequency FC from frequency setting unit 300, and also the preset dead time and shortest ON time of switching elements Q1 and Q2. Reference value computing unit 340 provides the computed result to selecting unit 350.

Voltage command setting unit 310 receives the input of torque command values TR1 and TR2 of motor generators MG1 and MG2, and rotation speeds MRN1 and MRN2 of motor generators MG1 and MG2. Voltage command setting unit 310 computes a voltage command value VHREF of input voltage (system voltage) VH of inverter 23 based on the aforementioned information, and provides voltage command value VHREF to target value computing unit 330.

Target value computing unit 330 receives the input of voltage command value VHREF from voltage command setting unit 310. Target value computing unit 330 also receives the input of output voltage VB of power storage device 28 and system voltage VH, detected by voltage sensors 10 and 13, respectively.

Target value computing unit 330 computes command duty DUTY based on the input information. Target value computing unit 330 outputs the computed result to selecting unit 350 and drive command generating unit 380.

Selecting unit 350 receives the input of upper and lower limits UL and LL of the settable duty range from reference value computing unit 340, and command duty DUTY from target value computing unit 330. Selecting unit 350 determines whether command duty DUTY is within the settable duty range. When command duty DUTY is within the settable duty range, selecting unit 350 sets a modification flag FLG at an OFF state. When command duty DUTY exceeds the settable duty range, selecting unit 350 sets modification flag FLG at an ON state. Selecting unit 350 provides modification flag FLG to frequency modifying unit 360.

Frequency modifying unit 360 receives the input of carrier frequency FC from frequency setting unit 300 and modification flag FLG from selecting unit 350. When modification flag FLG is OFF, frequency modifying unit 360 sets carrier frequency FC received from frequency setting unit 300 at a carrier frequency FC* to be used at oscillating unit 370. When the modification flag is ON, frequency modifying unit 360 sets carrier frequency FC* to be used at oscillating unit 370 lower than carrier frequency FC. Frequency modifying unit 360 outputs the set carrier frequency FC* to oscillating unit 370.

Frequency modifying unit 360 may be configured to modify the frequency to a fixed frequency that is preset, or modify the frequency variable according to the difference between the command duty and the aforementioned upper limit UL or lower limit LL.

Oscillating unit 370 generates and provides to drive command generating unit 380 a carrier wave CAR according to carrier frequency FC* received from frequency modifying unit 360.

Drive command generating unit 380 receives the input of carrier wave CAR from oscillating unit 370 and command duty DUTY from target value computing unit 330. Drive command generating unit 380 generates and provides to converter 12 a switching control command PWC to drive switching elements Q1 and Q2, based on the comparison between carrier wave CAR and command duty DUTY.

Figure 13:
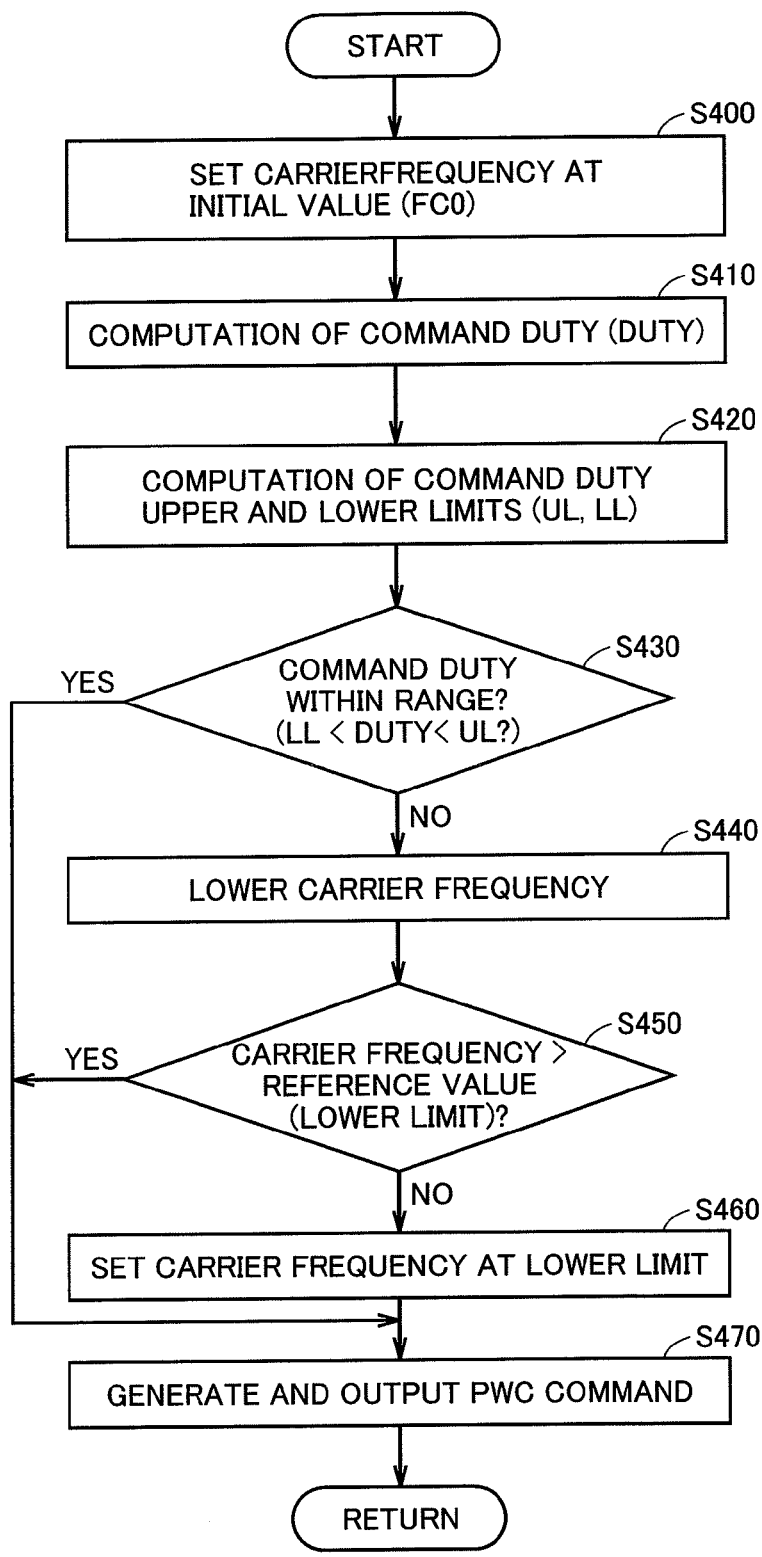
FIG. 13 is a flowchart to describe in detail a converter driving control process executed at an ECU according to the first embodiment.
Figure 16:
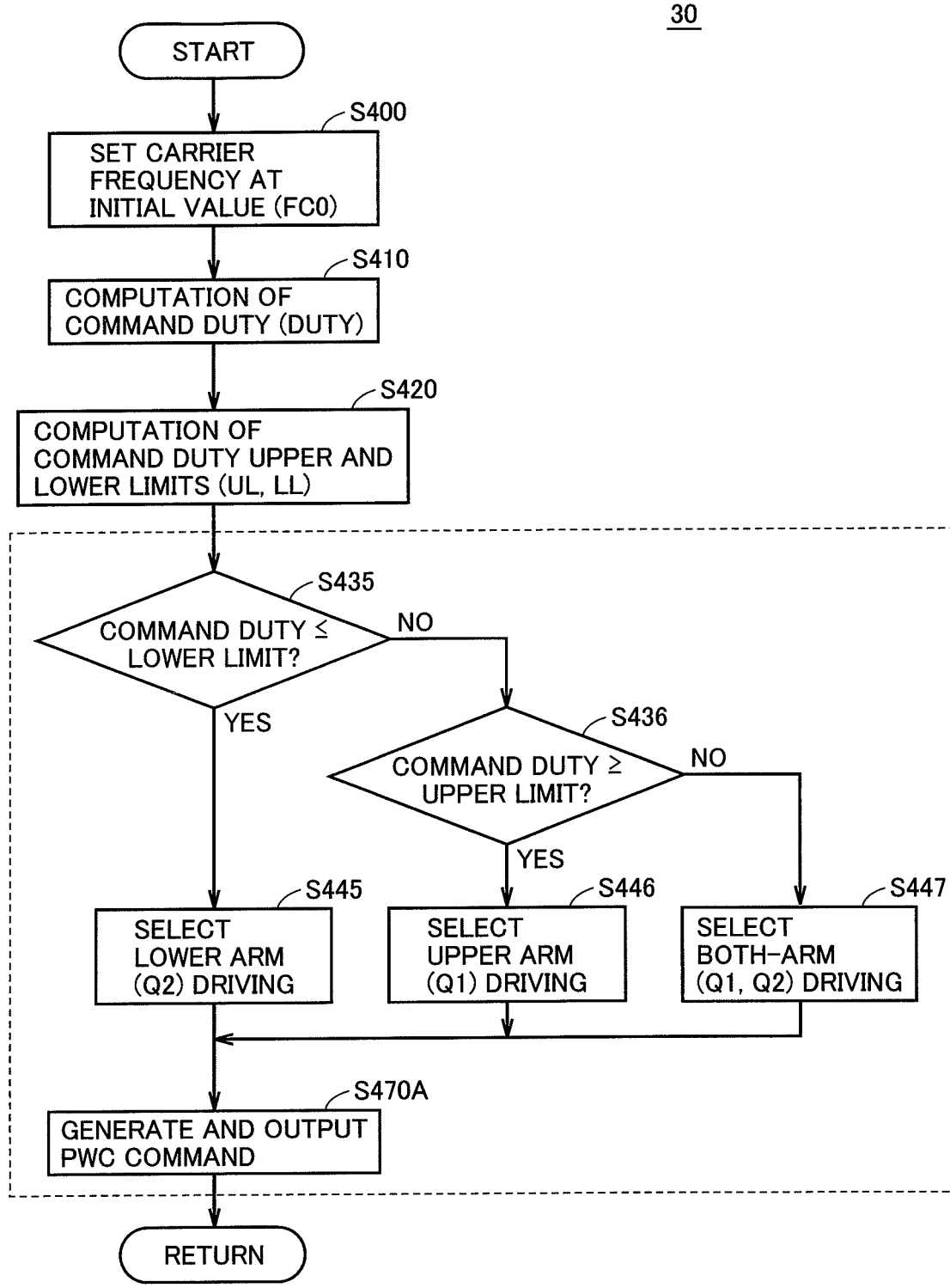
FIG. 16 is a flowchart to describe in detail a converter driving control process executed at an ECU according to the second embodiment.
Figure 21:
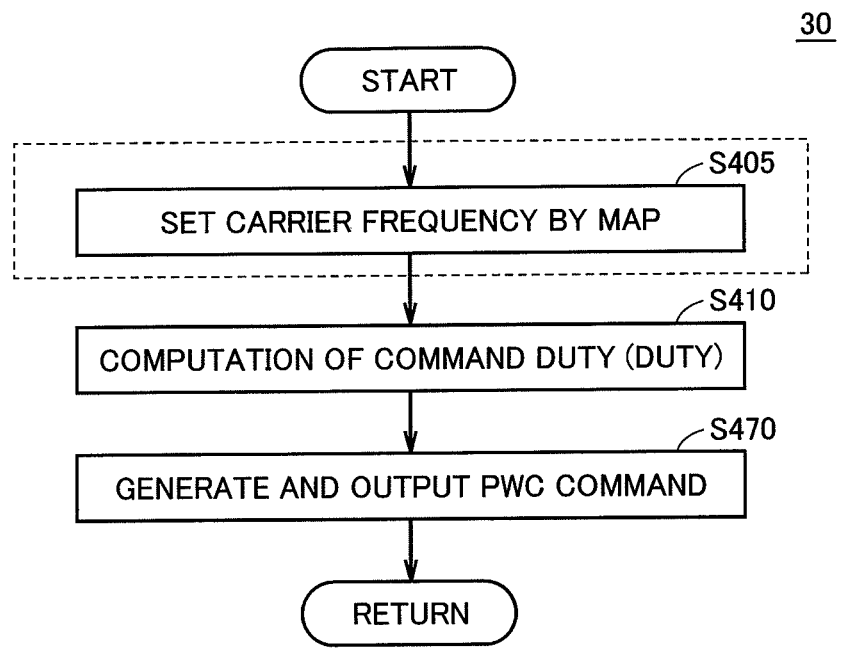
FIG. 21 is a flowchart to describe in detail a converter driving control process executed by an ECU according to the third embodiment.
Figure 23:
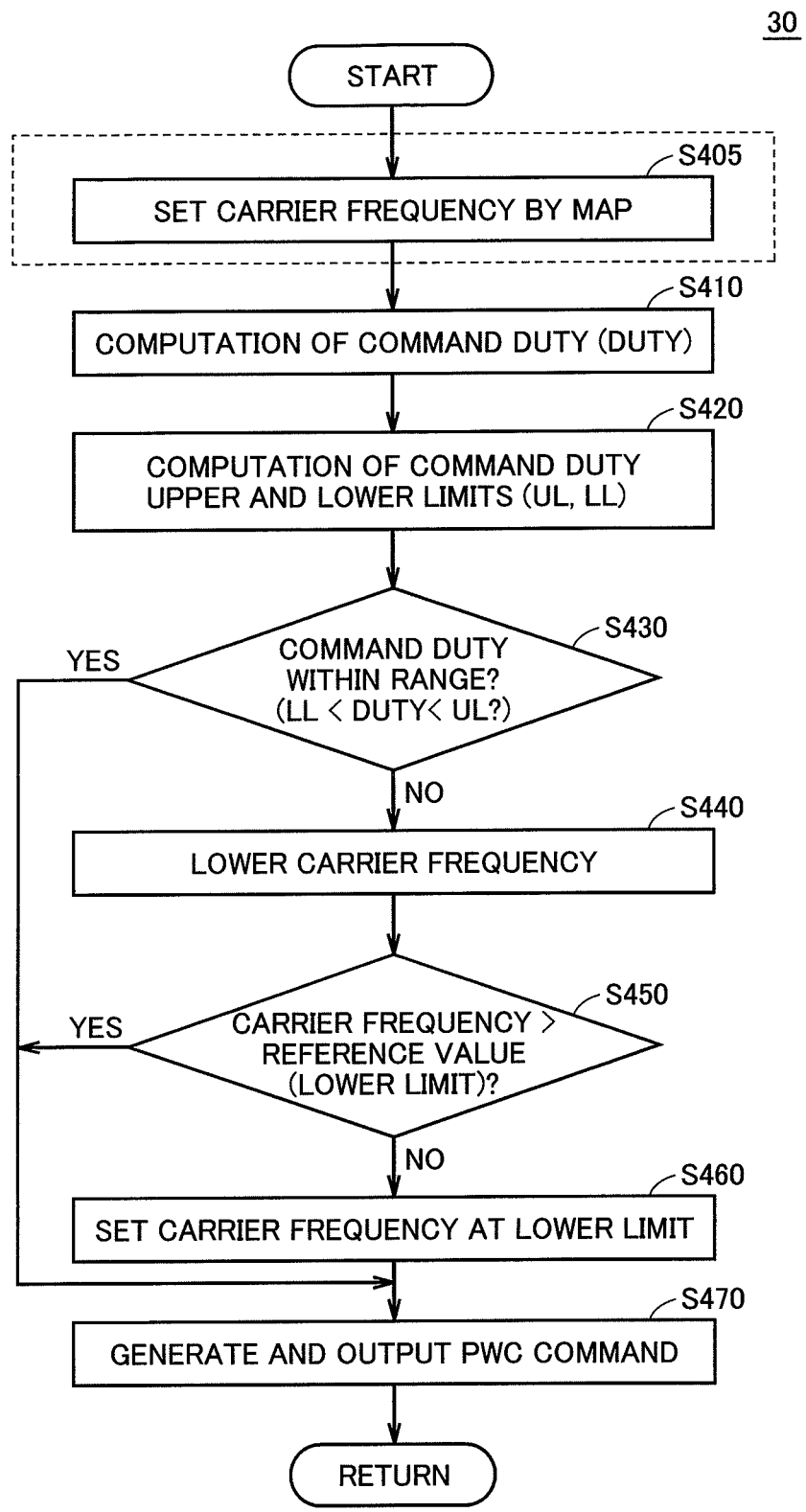
FIG. 23 is a flowchart to describe in detail a converter driving control process executed by an ECU in the event of the first embodiment and third embodiment being combined.

FIG. 13 is a flowchart to describe in detail a converter driving control process executed by ECU 30 of the first embodiment. Each step in the flowcharts of FIG. 13 and subsequent FIGS. 16, 21, and 23 is implemented by executing a program prestored in ECU 30 at a predetermined period. Alternatively, dedicated hardware (electronic circuitry) may be developed for some of the steps to realize the process.

Referring to FIGS. 12 and 13, at step (hereinafter, step is abbreviated as S) 400, ECU 30 causes frequency setting unit 300 to set carrier frequency FC at a predetermined initial value (FC0).

At S410, ECU 30 causes target value computing unit 330 to compute command duty DUTY of switching elements Q1 and Q2 based on voltage command value VHREF of the output voltage from converter 12 computed according to torque command values TR1, TR2, and the like of motor generators MG1 and MG2 as well as output voltage VB of power storage device 28.

At step S420, ECU 30 causes reference value computing unit 340 to compute upper limit UL and lower limit LL of the actual settable duty range taking into account the dead time, based on the set values of carrier frequency FC and the dead time of switching elements Q1 and Q2.

At S430, ECU 30 causes selecting unit 350 to determine whether command duty DUTY is within the settable range or not, i.e. whether LL<DUTY<UL.

When command duty DUTY is within the settable range (YES at S430), control proceeds to S470 where ECU 30 generates a carrier wave CAR with carrier frequency FC as the initial value (FC0) set at S400, and compares carrier wave CAR with command duty DUTY to generate and provide to converter 12 a control command PWC of switching elements Q1 and Q2.

When command duty DUTY exceeds the settable range, i.e. when DUTY≤LL or DUTY≥UL (NO at S430), control proceeds to S440 where ECU 30 modifies carrier frequency FC to a lower value.

Then, ECU 30 determines whether the carrier frequency lowered at S450 is larger than a preset reference value (lower limit) of the carrier frequency. This reference value (lower limit) of the carrier frequency is set taking into account the control period of ECU 30, the stability in control, and the like.

When the carrier frequency lowered at S450 is greater than the preset reference value (lower limit) of the carrier frequency (YES at S450), control proceeds to S470 where ECU 30 generates carrier wave CAR according to modified carrier frequency FC*, and also generates a control command PWC of switching elements Q1 and Q2 for output to converter 12.

When the carrier frequency lowered at S450 is equal to or less than the preset reference value (lower limit) of the carrier frequency (NO at S450), ECU 30 sets modified carrier frequency FC* at the lower limit of the carrier frequency at S460. Then, at S470, ECU 30 generates and provides to converter 12 a control command PWC.

By the control according to the processing set forth above, the carrier frequency can be maintained at the high level when target output voltage VHREF is in the settable voltage range. This provides the merit of higher frequency, down sizing of converter 12 and suppressing noise caused by switching. In addition, when the output voltage is restricted due to low temperature and the like, the restriction in the output voltage can be suppressed by setting the carrier frequency low to allow achieving the target output voltage. Since high-amperage current will flow to converter 12 in the case where target output voltage VHREF exceeds the settable voltage range, reduction in the carrier frequency allows heat generation at switching elements Q1 and Q2 to be suppressed. Accordingly, the heat-resistant specification of switching elements Q1 and Q2 can be relaxed, and/or the specification of the cooling facility (not shown) can be relaxed, allowing further reduction in cost.

Second Embodiment

The first embodiment is based on a configuration in which the settable voltage range is enlarged by lowering the carrier frequency when target output voltage VHREF exceeds the settable voltage range.

The second embodiment is based on a configuration in which the dead time term is reduced to enlarge the settable voltage range by switching control such that only one of switching elements Q1 and Q2 is driven (hereinafter, also referred to as "one-arm driving") when target output voltage VHREF exceeds the settable voltage range.

Figure 14:
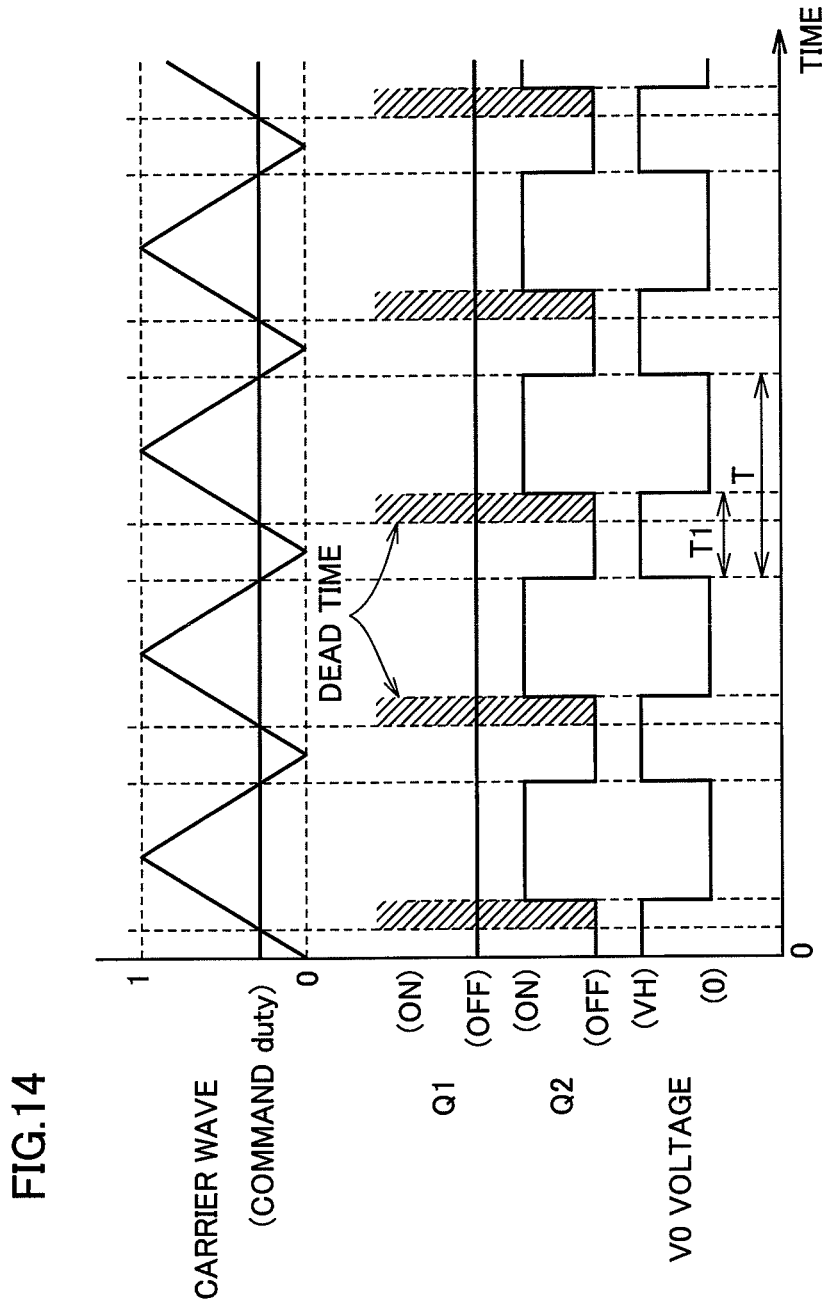
FIG. 14 is a timing chart to describe the actual duty when the converter driving control according to a second embodiment is applied in the power running state of FIG. 2.

FIG. 14 is a timing chart to describe the actual duty when the converter driving control of the second embodiment is applied in a power running state of FIG. 2.

In the case where reactor current IL is constantly positive, current flows through diode D1 irrespective of the operating state of switching element Q1 when switching element Q2 is OFF. Therefore, even if the drive of switching element Q1 is stopped in such a state, a current state is achieved similar to that where switching elements Q1 and Q2 are subject to both-arm driving.

Since the drive of switching element Q1 is still stopped now, the event of switching elements Q1 and Q2 rendered on simultaneously to cause shorting between electric power line PL2 and ground line NL will not occur. Therefore, it is basically not required to take into account the dead time. Moreover, it will not be necessary to take into account the shortest ON time of switching element Q1.

As a result, the command duty can be set until the time of T1 in FIG. 14 becomes equal to the shortest OFF time of switching element Q2, allowing the settable voltage range to be enlarged. Depending upon the load state, the mode may suddenly change from the power running state to the regeneration state (or from the regeneration state to the power running state), or from one-arm driving to both-arm driving. In such a case, the switching element to be driven will be switched. Therefore, there is a case where a dead time is provided before the driven switching element is rendered ON, as shown in FIG. 14, even in the case of one-arm driving.

FIG. 15 is a functional block diagram to describe the converter driving control executed by ECU 30 according to the second embodiment. FIG. 15 corresponds to the functional block diagram of FIG. 12 of the first embodiment, provided that drive control unit 320 is replaced with drive control unit 320A. Description of functional blocks in FIG. 15 similar to those in FIG. 12 will not be repeated.

Referring to FIG. 15, drive control unit 320A includes a target value computing unit 330, a reference value computing unit 340, a selecting unit 350, an oscillating unit 370, and a drive command generating unit 380A.

Target value computing unit 330 receives the input of voltage command value VHREF from voltage command setting unit 310. Target value computing unit 330 also receives the input of output voltage VB of power storage device 28 and system voltage VH detected at voltage sensors 10 and 13, respectively.

Target value computing unit 330 computes command duty DUTY based on the input information. Then, target value computing unit 330 outputs the computed result to selecting unit 350A and drive command generating unit 380A.

Reference value computing unit 340 computes upper limit UL and lower limit LL of the actual settable duty range in consideration of the dead time based on carrier frequency FC from frequency setting unit 300, as well as the dead time and shortest ON time of switching elements Q1 and Q2. The computing results are output to selecting unit 350A.

Selecting unit 350A receives the input of upper and lower limits UL and LL of the settable duty range from reference value computing unit 340, and command duty DUTY from target value computing unit 330. Selecting unit 350A selects either the both-arm driving mode or the one-arm driving mode in which only one of switching elements Q1 and Q2 is driven, depending upon whether command duty DUTY is within the settable duty range or not. Specifically, when command duty DUTY is within the settable duty range, selecting unit 350A selects the both-arm driving mode. When the command duty is equal to or higher than upper limit UL, selecting unit 350A selects a one-arm driving mode in which only the lower arm (switching element Q2) is driven. When the command duty is equal to or less than lower limit LL, selecting unit 350A selects a one-arm driving mode in which only the upper arm (switching element Q1) is driven.

Then, selecting unit 350A outputs a selection signal SEL of the selected driving mode to drive command generating unit 380A.

Oscillating unit 370 generates and provides to drive command generating unit 380A a carrier wave CAR according to carrier frequency FC set at frequency setting unit 300.

Drive command generating unit 380A receives the input of command duty DUTY from target value computing unit 330, selection signal SEL from selecting unit 350A, and carrier wave CAR from oscillating unit 370.

Drive command generating unit 380A compares command duty DUTY with carrier wave CAR to generate and output to converter 12 a switching control command PWC such that the drive arm selected by selection signal SEL is driven at command duty DUTY.

FIG. 16 is a flowchart to describe in detail a converter driving control process executed at ECU 30 of the second embodiment. FIG. 16 corresponds to the flowchart of FIG. 13 described in the first embodiment, provided that S435, S436, S445, S446, S447 and S470A are added instead of steps S430-S470. In FIG. 16, description of the steps similar to those in FIG. 13 will not be repeated.

Referring to FIGS. 15 and 16, ECU 30 calculates at S420 upper limit UL and lower limit LL of command duty DUTY based on the set values of the carrier frequency, the dead time of switching elements Q1 and Q2 and the like. Then, control proceeds to S435 where ECU 30 determines whether command duty DUTY is equal to or lower than lower limit LL or not.

When command duty DUTY is equal to or lower than lower limit LL (YES at S435), control proceeds to S445 where ECU 30 selects the one-arm driving mode in which only the lower arm (switching element Q2) is driven.

When command duty DUTY is greater than lower limit LL (NO at S435), control proceeds to S436 where ECU 30 determines whether command duty DUTY is equal to or higher than upper limit UL or not.

When command duty DUTY is equal to or higher than upper limit UL (YES at S435), control proceeds to S446 where ECU 30 selects the one-arm driving mode in which only the upper arm (switching element Q1) is driven.

When command duty DUTY is smaller than upper limit UL, i.e. when the command duty is within the settable range (NO at S436), control proceeds to S447 where ECU 30 selects the both-arm driving mode.

At S470A, ECU 30 generates carrier wave CAR with carrier frequency FC as the initial value (FC0) set at S400, compares this carrier wave CAR with command duty DUTY, and then generates and outputs to converter 12 a control command PWC such that switching elements Q1 and Q2 are controlled in the driving mode selected at S445, S446 or S447.

By the control according to the processing set forth above, since driving can be conducted always at a high carrier frequency, there can be provided the merit of higher frequency, suppressing noise caused by the down sizing of converter 12 and by switching.

Third Embodiment

The first and second embodiments were described based on a configuration in which the settable range of command duty DUTY is set based on the initial value (fixed value) of carrier frequency FC set at frequency setting unit 300 and the set dead time, and modifying the carrier frequency or the driving arm selection when command duty DUTY exceeds the settable range.

The third embodiment will be described based on a configuration in which the carrier frequency is lowered in advance when there is an effect of the dead time in setting carrier frequency FC.

Such a configuration is advantageous in that the control processing can be rendered simple since the computing function of the settable range of command duty DUTY and the determination function based on comparison between the settable range and command duty required in the first embodiment or second embodiment are dispensable.

FIG. 17 is a functional block diagram to describe the converter driving control executed by ECU 30 according to the third embodiment.

Referring to FIGS. 1 and 17, ECU 30 includes a frequency setting unit 300A, a voltage command setting unit 310, and a drive control unit 320B. Drive control unit 320B includes a target value computing unit 330, an oscillating unit 370, and a drive command generating unit 380.

Frequency setting unit 300A receives the input of output voltage VB from power storage device 28 detected by voltage sensor 10, output current IB from power storage device 28 detected by current sensor 11, current IL flowing through reactor L1 detected by current sensor 18, and load power PR of load device 45. Frequency setting unit 300A sets carrier frequency FC by referring to a preset map, based on the input information.

Figure 18:
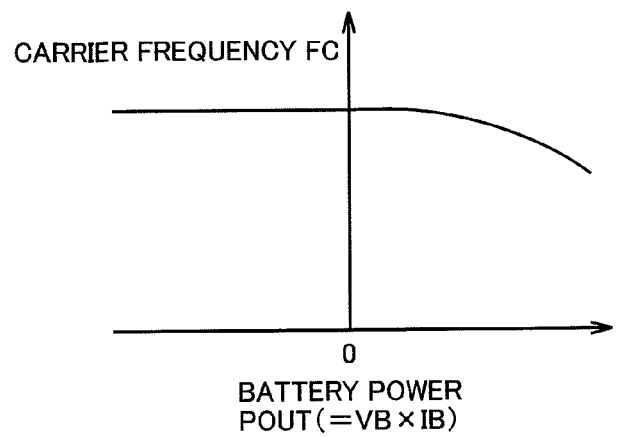
FIG. 18 represents a first example of a map to set the carrier frequency.
Figure 19:
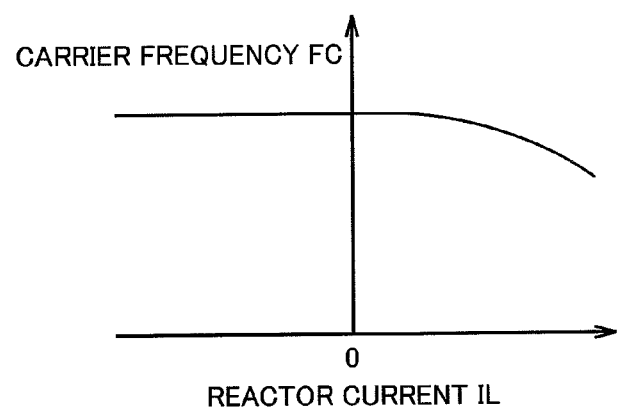
FIG. 19 represents a second example of a map to set the carrier frequency.
Figure 20:
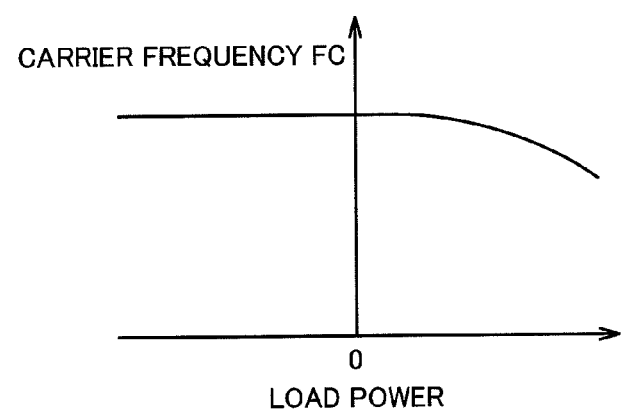
FIG. 20 represents a third example of a map to set the carrier frequency.

FIGS. 18-20 represent examples of a map to set carrier frequency FC. FIG. 18 represents a first example of a map to set carrier frequency FC. Carrier frequency FC is set based on output power POUT (=VB×IB) of power storage device 28. The carrier frequency FC may also be set based on output voltage VB or output current IB of power storage device 28.

FIG. 19 represents a second example of a map to set carrier frequency FC. Carrier frequency FC is set based on reactor current IL flowing through reactor L1. FIG. 20 represents a third example of a map to set carrier frequency FC based on load power PR of load device 45.

Referring to FIGS. 1 and 17 again, voltage command setting unit 310 receives the input of torque command values TR1 and TR2 of motor generators MG1 and MG2, and rotation speeds MRN1 and MRN2 of motor generators MG1 and MG2. Voltage command setting unit 310 computes and outputs to target value computing unit 330 a voltage command value VHREF of input voltage (system voltage) VH of inverter 23 based on the input information.

Target value computing unit 330 receives the input of voltage command value VHREF from voltage command setting unit 310. Target value computing unit 330 also receives the input of output voltage VB of power storage device 28 and system voltage VH, detected by voltage sensors 10 and 13, respectively.

Target value computing unit 330 computes command duty DUTY based on the input information. Target value computing unit 330 outputs the computed result to drive command generating unit 380.

Oscillating unit 370 generates and outputs to drive command generating unit 380 a carrier wave CAR according to carrier frequency FC received from frequency setting unit 300A.

Drive command generating unit 380 receives the input of carrier wave CAR from oscillating unit 370 and command duty DUTY from target value computing unit 330. Drive command generating unit 380 generates and outputs to converter 12 a switching control command PWC to drive switching elements Q1 and Q2, based on the comparison between carrier wave CAR and command duty DUTY.

FIG. 21 is a flowchart to describe in detail the converter driving control process executed at ECU 30 according to the third embodiment.

Referring to FIGS. 17 and 21, ECU 30 sets at S405 a carrier frequency FC by referring to a map as shown in FIGS. 18-20, based on information such as output voltage VB and output current IB of power storage device 28, reactor current IL, and the like.

At S410, ECU 30 causes target value computing unit 330 to compute command duty DUTY of switching elements Q1 and Q2 based on output voltage VB of power storage device 28 and voltage command value VHREF of the output voltage of converter 12 computed according to torque command values TR1, TR2, and the like of motor generators MG1 and MG2.

At S470, ECU generates carrier wave CAR according to carrier frequency FC set at S405, and compares this carrier wave CAR with command duty DUTY to generate and output to converter 12 a control command PWC of switching elements Q1 and Q2.

By the control according to the processing set forth above, the carrier frequency in the range affected by the dead time can be set low in advance. Accordingly, switching can be controlled at a high carrier frequency in a range where there is no effect of the dead time. This provides the merit of higher frequency, suppressing noise caused by the down sizing of converter 12 and by switching. In addition, a lower setting of the carrier frequency can suppress restriction, if any, of the output voltage due to low temperature, so that the target output voltage can be achieved.

Modification of Third Embodiment

Although the above-described third embodiment is based on a configuration in which carrier frequency FC is preset in consideration of the effect of the dead time, there is a possibility of exceeding the settable range of command duty depending upon the actually computed command duty DUTY.

The present modification will be described according to a configuration based on a combination of third embodiment with the first or second embodiment.

FIG. 22 is a functional block diagram to describe the converter driving control executed by ECU 30 when the first embodiment and third embodiment are combined. FIG. 22 corresponds to the functional block diagram of FIG. 12 described in the first embodiment, provided that frequency setting unit 300 is replaced with a frequency setting unit 300A of the third embodiment. Each functional block is similar to that described with reference to FIGS. 12 and 17. Therefore, detailed description thereof will not be repeated.

FIG. 23 is a flowchart to describe in detail a converter driving control process executed at ECU 30 when the first embodiment and the third embodiment are combined. In FIG. 23, step S400 in the flowchart of FIG. 18 described in the first embodiment is replaced with step 405 of FIG. 21 described in the third embodiment. In this context, detailed description of each step will not be repeated.

Further, although not shown, a configuration based on a combination of the second and third embodiments is allowed. In this case, frequency setting unit 300 in the functional block diagram of FIG. 15 is replaced with frequency setting unit 300A in the functional block diagram of FIG. 17, and step S400 in the flowchart of FIG. 16 is replaced with step S405 in the flowchart of FIG. 21. Description of each functional block and each step will not be repeated.

By further applying the third embodiment to the first or second embodiment, the restriction on the output voltage occurring by the dead time at converter 12 can be suppressed.

Converter 12 of the present embodiment is an example of "voltage conversion device" of the present invention.

It should be understood that the embodiments disclosed herein are illustrative and non-restrictive in every respect. The scope of the present invention is defined by the appended claims, rather than the description set forth above, and all changes that fall within limits and bounds of the claims, or equivalence thereof are intended to be embraced by the claims.

REFERENCE SIGNS LIST 10, 13 voltage sensor; 11, 18, 24, 25 current sensor; 12 converter; 14, 22, 23 inverter; 15 U-phase upper and lower arms; 16 V-phase upper and lower arms; 17 W-phase upper and lower arms; 20 DC voltage generator; 26, 27 rotation angle sensor; 28 power storage device; 30 ECU; 40 engine; 41 power split device; 42 driving wheel; 45 load device; 100 hybrid vehicle; 300, 300A frequency setting unit; 310 voltage command setting unit; 320, 320A, 320B drive control unit; 330 target value computing unit; 340 reference value computing unit; 350, 350A selecting unit; 360 frequency modifying unit; 370 oscillating unit; 380, 380A drive command generating unit; C1, C2 smoothing capacitor; D1-D8 diode; L1 reactor; MG1, MG2 motor generator; NL ground line;

PL1, PL2 electric power line; Q1-Q8 switching element; SR1, SR2 system relay; V0 connection node.

The invention claimed is:

1. A control device for a voltage conversion device capable of voltage conversion between a power storage device and a load device,
said voltage conversion device including a first switching element and a second switching element connected in series between an electric power line and a ground line of said load device, and performing said voltage conversion by a switching operation,
said switching operation including a dead time identified as a period of time during which both of said first switching element and said second switching element are at an OFF state,
said control device comprising:
a frequency setting unit setting a carrier frequency of said switching operation, and
a drive control unit configured to control switching of said first switching element and said second switching element based on a voltage command value of said voltage conversion and said carrier frequency,
said drive control unit controlling switching of said first switching element and said second switching element so as to enlarge an output allowable voltage range of said voltage conversion device restricted by said dead time, based on information related to electric power input to and output from said voltage conversion device.

2. The control device for a voltage conversion device according to claim 1, wherein
said information related to electric power input to and output from said voltage conversion device includes a target duty of said first switching element and said second switching element,
said drive control unit includes
a target value computing unit configured to compute said target duty based on said voltage command value, and
a reference value computing unit configured to compute a duty range defining said output allowable voltage range based on said carrier frequency and said dead time,
said drive control unit performing said switching control so as to enlarge said output allowable voltage range when said target duty exceeds said duty range.

3. The control device for a voltage conversion device according to claim 2, wherein said drive control unit further includes a frequency modifying unit configured to lower said carrier frequency when said target duty exceeds said duty range.

4. The control device for a voltage conversion device according to claim 2, wherein said drive control unit further includes
a selecting unit selecting one of said first switching element and said second switching element when said target duty exceeds said duty range, and selecting both of said first switching element and said second switching element when said target duty is within said duty range, and
a drive command generating unit generating a drive command of the switching element selected by said selecting unit.

5. The control device for a voltage conversion device according to claim 4, wherein said selecting unit selects said second switching element when said target duty is higher than an upper limit of said duty range.

6. The control device for a voltage conversion device according to claim 4, wherein said selecting unit selects said first switching element when said target duty is smaller than a lower limit of said duty range.

7. The control device for a voltage conversion device according to claim 1, wherein said frequency setting unit sets said carrier frequency variable based on information related to electric power input to and output from said voltage conversion device.

8. The control device for a voltage conversion device according to claim 7, wherein said information related to electric power input to and output from said voltage conversion device includes at least one of an output power, an output voltage, and an output current of said power storage device.

9. The control device for a voltage conversion device according to claim 7, wherein
said voltage conversion device further includes a reactor provided at a path coupling a connection node of said first switching element and said second switching element and a positive electrode terminal of said power storage device and
said information related to electric power input to and output from said voltage conversion device includes a reactor current flowing through said reactor.

10. The control device for a voltage conversion device according to claim 7, wherein said information related to electric power input to and output from said voltage conversion device includes electric power supplied to said load device.

11. A vehicle comprising:
a power storage device,
a rotating electric machine for generating a driving force to drive said vehicle,
an inverter for driving said rotating electric machine,
a voltage conversion device configured to be capable of voltage conversion between said power storage device and said inverter, and
a control device for controlling said voltage conversion device,
said voltage conversion device including a first switching element and a second switching element connected in series between an electric power line and a ground line of said inverter, and performing said voltage conversion by a switching operation,
said switching operation including a dead time identified as a period of time during which both of said first switching element and said second switching element are at an OFF state,
said control device comprising:
a frequency setting unit setting a carrier frequency of said switching operation, and
a drive control unit configured to control switching of said first switching element and said second switching element, based on a voltage command value of said voltage conversion and said carrier frequency,
said drive control unit controlling switching of said first switching element and said second switching element so as to enlarge an output allowable voltage range of said voltage conversion device restricted by said dead time, based on information related to electric power input to and output from said voltage conversion device.

12. The vehicle according to claim 11, wherein
said information related to electric power input to and output from said voltage conversion device includes a target duty of said first switching element and said second switching element,
said drive control unit includes
a target value computing unit configured to compute said target duty based on said voltage command value, and a reference value computing unit configured to compute a duty range defining said output allowable voltage range, based on said carrier frequency and said dead time, said drive control unit performing said switching control so as to enlarge said output allowable voltage range when said target duty exceeds said duty range.

13. The vehicle according to claim 12, wherein said drive control unit further includes a frequency modifying unit configured to lower said carrier frequency when said target duty exceeds said duty range.

14. The vehicle according to claim 12, wherein said drive control unit further includes a selecting unit selecting one of said first switching element and said second switching element when said target duty exceeds said duty range, and selecting both of said first switching element and said second switching element when said target duty is within said duty range, and a drive command generating unit generating a drive command of the switching element selected by said selecting unit.

15. A control method for a voltage conversion device capable of voltage conversion between a power storage device and a load device, said voltage conversion device including a first switching element and a second switching element connected in series between an electric power line and a ground line of said load device, and performing said voltage conversion by a switching operation, said switching operation including a dead time identified as a period of time during which both of said first switching element and said second switching element are at an OFF state, said control method comprising the steps of:

setting a carrier frequency of said switching operation, controlling switching of said first switching element and said second switching element, based on a voltage command value of said voltage conversion and said carrier frequency, and performing switching control of said first switching element and said second switching element so as to enlarge an output allowable voltage range of said voltage conversion device restricted by said dead time, based on information related to electric power input to and output from said voltage conversion device.

* * * * *